(12) United States Patent
Parker

(10) Patent No.: US 8,710,820 B2
(45) Date of Patent: Apr. 29, 2014

(54) SWITCHED CAPACITOR HOLD-UP SCHEME FOR CONSTANT BOOST OUTPUT VOLTAGE

(75) Inventor: Ernest Clyde Parker, Mill Creek, WA (US)

(73) Assignee: Crane Electronics, Inc., Redmond, WA (US)

( * ) Notice: Subject to any disclaimer, the term of this patent is extended or adjusted under 35 U.S.C. 154(b) by 273 days.

(21) Appl. No.: 12/751,067

(22) Filed: Mar. 31, 2010

(65) Prior Publication Data

US 2011/0241637 A1    Oct. 6, 2011

(51) Int. Cl.
  *H02M 3/156*    (2006.01)
(52) U.S. Cl.
  USPC ............ 323/288; 323/266; 323/271; 323/284
(58) Field of Classification Search
  USPC ......... 323/225, 282–285, 266, 268, 288, 271, 323/300, 326, 351
  See application file for complete search history.

(56) References Cited

U.S. PATENT DOCUMENTS

| | | | |
|---|---|---|---|
| 4,635,002 A | 1/1987 | Riebeek | |
| 4,743,835 A | 5/1988 | Bossé et al. | 323/266 |
| 5,418,502 A | 5/1995 | Ma et al. | |
| 5,521,807 A | 5/1996 | Chen et al. | |
| 5,631,822 A | 5/1997 | Silberkleit et al. | |
| 5,694,303 A | 12/1997 | Silberkleit et al. | |
| 6,043,705 A | 3/2000 | Jiang | 327/589 |
| 6,137,373 A | 10/2000 | Mori | |
| 6,472,852 B1 | 10/2002 | Lethellier | |
| 6,697,955 B1* | 2/2004 | Malik et al. | 713/340 |
| 6,998,901 B2 | 2/2006 | Lee | |
| 7,061,212 B2 | 6/2006 | Phadke | 323/222 |
| 7,515,005 B2 | 4/2009 | Dan | |
| 7,564,706 B1* | 7/2009 | Herbert | 363/124 |
| 7,579,901 B2 | 8/2009 | Yamashita | |
| 7,730,981 B2* | 6/2010 | McCabe et al. | 180/65.225 |
| 7,742,318 B2 | 6/2010 | Fu et al. | |
| 8,067,992 B2 | 11/2011 | Chen et al. | |
| 2002/0071300 A1* | 6/2002 | Jang et al. | 363/125 |
| 2006/0039172 A1 | 2/2006 | Soldano | 363/59 |
| 2006/0132105 A1* | 6/2006 | Prasad et al. | 323/222 |
| 2008/0031014 A1 | 2/2008 | Young | 363/16 |
| 2009/0174381 A1 | 7/2009 | Ojanen et al. | |
| 2009/0237057 A1* | 9/2009 | Dishman et al. | 323/285 |
| 2009/0256547 A1* | 10/2009 | Akyildiz et al. | 323/350 |
| 2009/0302775 A1* | 12/2009 | Alexandrov | 315/224 |
| 2010/0014330 A1* | 1/2010 | Chang et al. | 363/89 |
| 2010/0117715 A1 | 5/2010 | Ariyama | |

(Continued)

OTHER PUBLICATIONS

Merriam Webster, http://www.merriam-webster.com/dictionary/directly.*

(Continued)

*Primary Examiner* — Adolf Berhane
*Assistant Examiner* — Gustavo Rosario Benitez
(74) *Attorney, Agent, or Firm* — Seed IP Law Group PLLC

(57) ABSTRACT

A power architecture receives an input signal at an input node and converts the input signal into an intermediate signal with a power conversion stage. The power conversion stage supplies the intermediate signal to an output node of the power conversion stage where the intermediate signal is filtered with an operating capacitance coupled to the output node. A hold-up capacitance is charged, and when a loss of the input signal is detected, the hold-up capacitance is coupled to the input node.

23 Claims, 12 Drawing Sheets

(56) References Cited

U.S. PATENT DOCUMENTS

| | | |
|---|---|---|
| 2013/0020867 A1 | 1/2013 | Hughes et al. |
| 2013/0021008 A1 | 1/2013 | Hume et al. |
| 2013/0021009 A1 | 1/2013 | Waltman et al. |
| 2013/0021108 A1 | 1/2013 | Hughes |
| 2013/0021702 A1 | 1/2013 | Waltman et al. |

OTHER PUBLICATIONS

Xing, Yan et al., "Power System Architecture with Back-Up Power for Servers," ERC Program of the National Science Foundation, 5 pages.

International Search Report for PCT/US2011/030778, mailed Oct. 14, 2011, 3 pages.

Hume et al., "Power Converter Apparatus and Method With Compensation for Light Load Conditions," Office Action mailed Nov. 6, 2013, for U.S. Appl. No. 13/185,142, 11 pages.

"Application Guide: Theory of Operation," MicroPower Direct, URL= http://micropowerdirect.com/PDF%20Files/Application%20Notes/Power%20Supply%20Theory%20of%20Operation.pdf, download date Apr. 18, 2012, 6 pages.

"Buck converter," URL= http://en.wikipedia.org/wiki/Buck_converter, download date Jun. 23, 2011, 14 pages.

"Maximum Flexible Power (MFP) Single Output Point of Load: Technical Preview—3—6 VDC in, 7 AMP, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL= http://www.maxim-ic.com/appnotes/index.mvp/id/652, download date Jun. 22, 2011, 6 pages.

Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

Waltman et al., "Power Converter Apparatus and Methods," U.S. Appl. No. 61/508,937, filed Jul. 18, 2011, 139 pages.

* cited by examiner

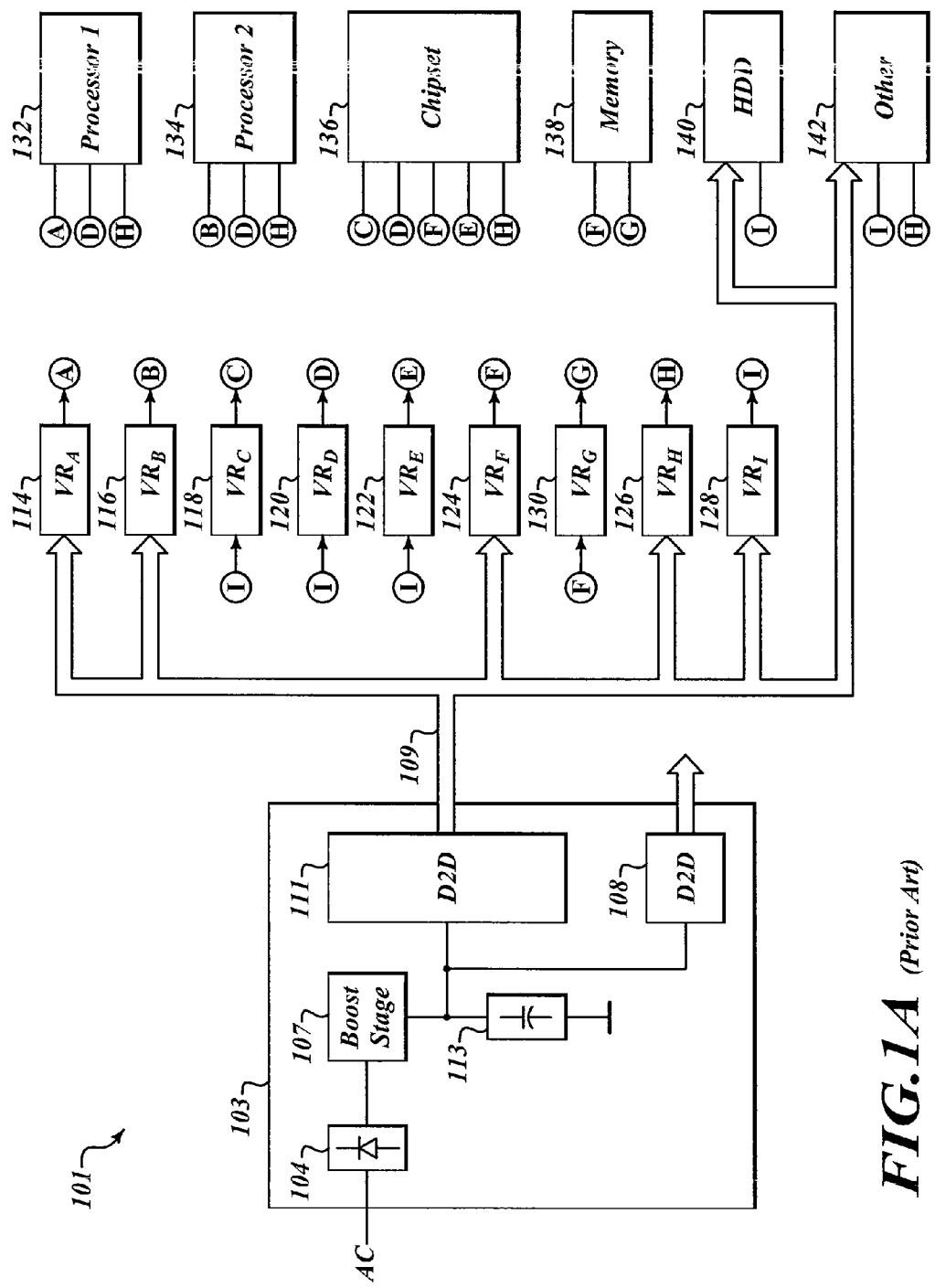
FIG.1A *(Prior Art)*

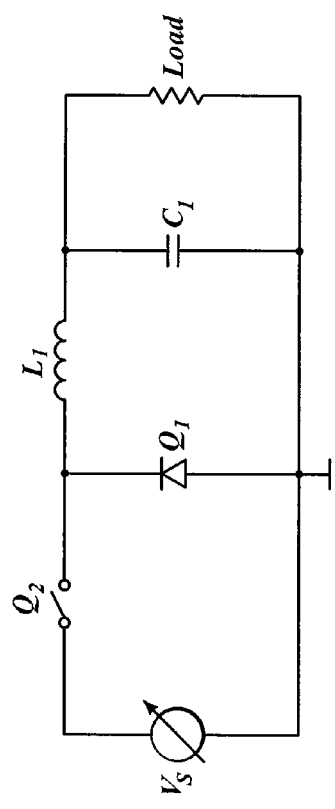
FIG. 2C *(Prior Art)*
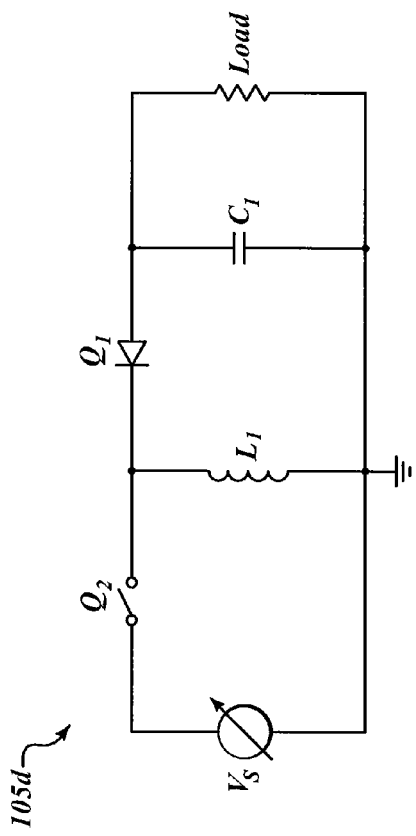
FIG. 2D *(Prior Art)*

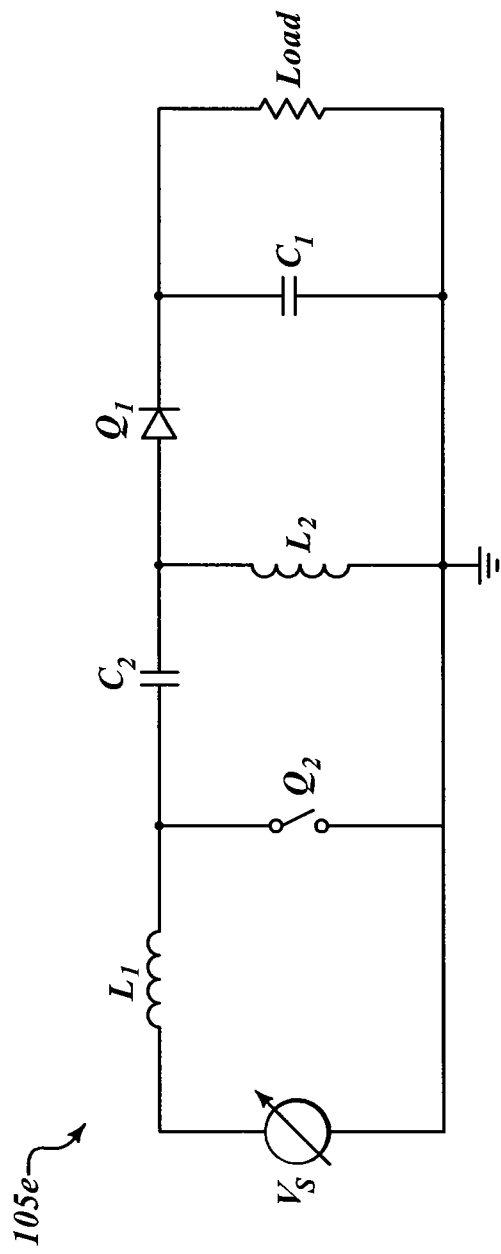
FIG.2E *(Prior Art)*

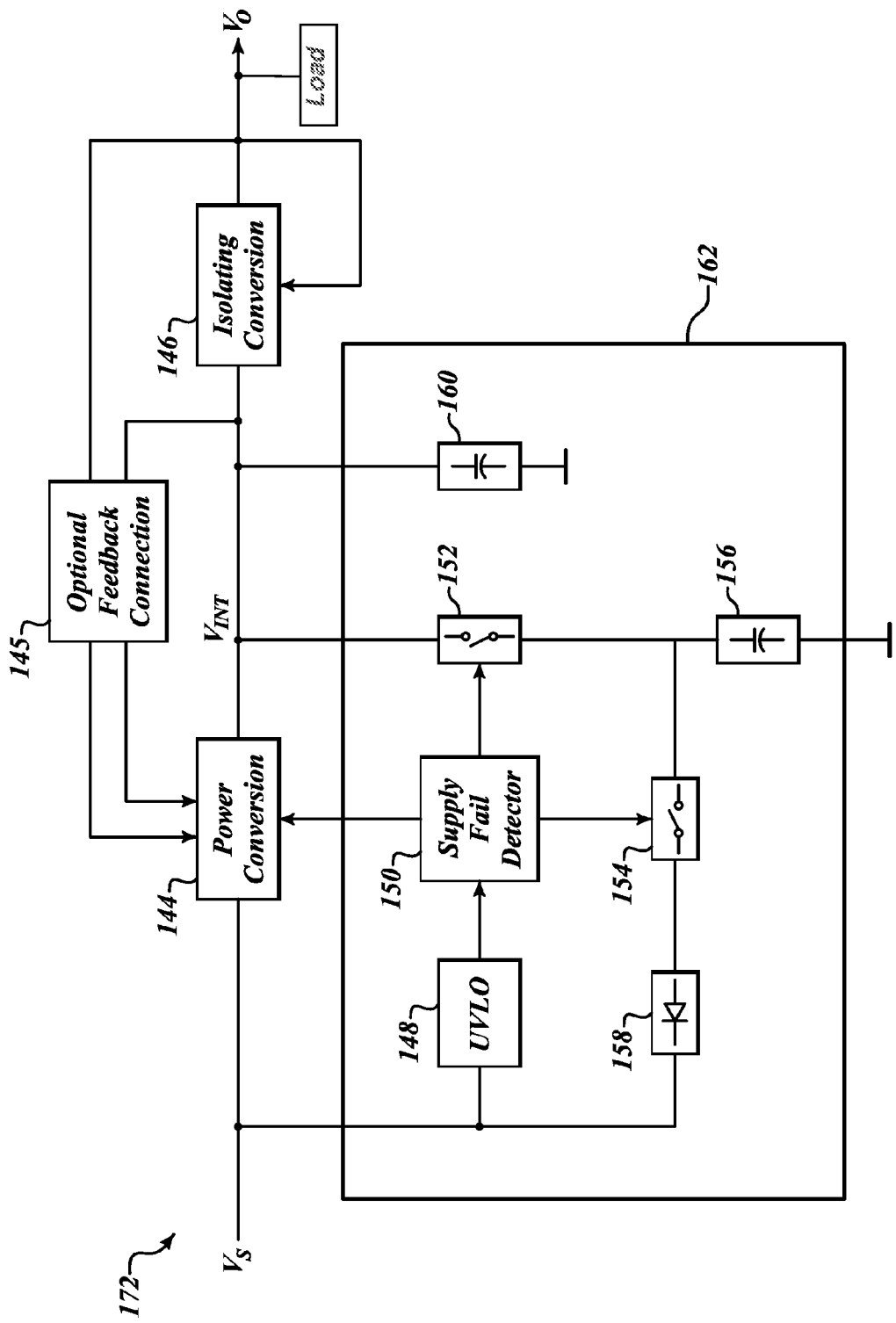

SWITCHED CAPACITOR HOLD-UP SCHEME FOR CONSTANT BOOST OUTPUT VOLTAGE

BACKGROUND

1. Technical Field

This disclosure is generally related to power converters, and is more particularly related to regulated power converters.

2. Description of the Related Art

Power converters are used in both alternating current (AC) input and direct current (DC) input applications where energy storage is required for hold-up and filtering in both normal and power-fail circumstances. In such applications, multistage conversion often provides a desirable power architecture. One example is a power architecture that uses multistage conversion providing several outputs on sub-3.3VDC output rails. Such a power architecture is particularly useful in systems having multiple circuit card assemblies (multi-CCA) of moderate to high power (e.g., about 200 W to 2 KW and higher). In such multi-CCA systems, an initial power stage converts source AC or DC power to an intermediate DC voltage, typically 5 VDC, 12 VDC, 28 VDC, or 48 VDC, which is distributed to the CCAs through a backplane or interconnecting cable, and one or more final stages of conversion local to each CCA to convert the intermediate voltage to the low voltage(s) required.

Many applications require power supplies having a plurality of outputs. For example, computing based applications utilize power supplies that can deliver a number of distinct voltage outputs. One example of this type of multi-output power supply architecture is used in a computing server system. An example of such power supply architecture is shown in the computing server 101 of FIG. 1A.

FIG. 1A illustrates a known computing server 101. An alternating current (AC) source is input to an initial rectifier circuit 104 of a main power supply 103. The output of the rectifier circuit 104 is input to a boost stage 107. The output of the boost stage 107 is coupled to a first DC-to-DC power supply 108, a second DC-to-DC power supply 111, and to an energy storage circuit 113. In the known computing server embodiment 101 of FIG. 1A, the main power supply 103 provides two outputs for the computing server 101. A first output, produced by the first DC-to-DC power supply 108, is a 5V standby voltage. A second output, produced by the second DC-to-DC power supply 111, is a 12V supply voltage. The 12V supply voltage in the embodiment of FIG. 1A is used to supply several power distribution circuits of the computing server 101.

A first power distribution circuit 114 includes a voltage regulator $VR_A$. The first power distribution circuit 114 receives a 12V input from the second DC-to-DC converter 111 of the main power supply 103, and produces a regulated voltage output A. Additional power distribution circuits $VR_B$, $VR_F$, $VR_H$, and $VR_I$ also receive the 12V input from the second DC-to-DC converter 111 of the main power supply 103. The power distribution circuits $VR_B$, $VR_F$, $VR_H$, and $VR_I$ produce regulated voltage outputs B, F, H, and I respectively.

Another set of power distribution circuits $VR_C$, $VR_D$, and $VR_E$ receive at their inputs respectively the regulated output voltage I from power distribution circuit $VR_I$. The power distribution circuits $VR_C$, $VR_D$, and $VR_E$ produce regulated voltage outputs C, D, and E respectively. One additional power distribution circuit $VR_G$ receives regulated voltage output F from $VR_F$ and produces further regulated voltage output G.

The distributed power circuits illustrated in FIG. 1A show an intermediate bus architecture wherein a main power supply 103 produces a system voltage signal for distribution via an intermediate bus 109. The intermediate bus 109 carries the common system voltage signal to multiple individual power distribution circuits that can each be physically located very close to their energy consuming loads. For example, power distribution circuit $VR_A$ can be physically located very close to a first processor 132. The close proximity of a power distribution circuit to its energy consuming load helps to reduce energy losses that occur over longer transmission paths of low voltage, high current power signals.

Table 1 identifies particular operating parameters of the power distribution circuits $VR_A$-$VR_I$. The operating parameters represent one embodiment of the known power architecture of computing server 101 in FIG. 1A.

TABLE 1

| Power Distribution Circuit | Operating Efficiency | Input | Output Voltage | Output Current | Output Dynamic transient |
|---|---|---|---|---|---|
| $VR_A$ | 80% | 12 VDC | 0.95~1.7 V | 100 A | 100 A/μsec |
| $VR_B$ | 80% | 12 VDC | 0.95~1.7 V | 100 A | 100 A/μsec |
| $VR_C$ | 86% | $VR_I$ | 1.5 V | 6 A | 1 A/nsec |
| $VR_D$ | 85% | $VR_I$ | 1.2 V | 7.2 A | 1 A/nsec |
| $VR_E$ | 26% | $VR_I$ | 1.3 V | 0.5 A | 1 A/nsec |
| $VR_F$ | 86% | 12 VDC | 1.8 V | 0.65 A | 0.025 A/nsec |
| $VR_G$ | 85% | $VR_F$ | 0.9 V | | |
| $VR_H$ | 96% | 12 VDC | 3.3 V | 0.24 A | 0.36 A/nsec |
| $VR_I$ | 96% | 12 VDC | 5 V | | |

The known computing server 101 of FIG. 1A also includes several conventional server elements. First and second processors 132, 134 respectively execute firmware and/or software instructions to configure and implement the operations of the computing server 101. A chipset 136 includes one or more peripherals of the server such as video rendering circuits, communication ports, clock generation, and the like.

A memory 138 in the computing server 101 includes any volatile and non-volatile electronic storage media as may be used by the server. For example, non-volatile memory, such as flash memory or the like, is useful for storing configuration settings, calibration settings, clock timing information, program instructions, and other information that persists through a power-cycle operation of the computing server 101. Volatile memory, such as random access memory (RAM), is useful for quickly storing and retrieving operating data used by one or more of the processors 132, 134. A hard disk drive (HDD) 140 in computing server 101 is conventionally used for storing program instructions and data.

A final element of the known computing server 101 captures other functions 142 found in conventional computing servers. For example, some servers add particular peripherals for control and use by the processors 132, 134. In some cases, the other functions 142 include audio input/output devices, security devices, data input device controllers such as keyboards, mice, track pads, touch screens, and many others.

As is evident in the computing server 101 of FIG. 1A, the power distribution circuits 114-130 are operable to provide a range of power values for distribution in the computing server 101. Shown in one embodiment, the first processor 132 receives regulated voltage outputs A, D, and H. The second processor 134 receives regulated voltage outputs B, D, and H. Chipset 136 receives regulated voltage outputs C, D, F, E, and H. Memory receives inputs F and G and HDD receives a 12V source from the second DC-to-DC converter 111 and regulated voltage output I. The other circuits 142 receive the 12V source from DC-to-DC converter 111 and regulated voltage inputs H and I.

Table 2 identifies particular operating inputs to the elements of the computing server 101. The operating inputs represent one embodiment of the power architecture of computing server 101 in FIG. 1A.

TABLE 2

| Computing Server Component | Input | Output Voltage | Current | Dynamic transient |
|---|---|---|---|---|
| Processor 1 | $VR_A$ | 0.95~1.7 V | 100 A | 100 A/μsec |
|  | $VR_D$ | 1.2 V | 7.2 A | 1 A/nsec |
|  | $VR_H$ | 3.3 V | 30 mA |  |
| Processor 2 | $VR_B$ | 0.95~1.7 V | 100 A | 100 A/μsec |
|  | $VR_D$ | 1.2 V | 7.2 A | 1 A/nsec |
|  | $VR_H$ | 3.3 V | 30 mA |  |
| Chipset | $VR_C$ | 1.5 V | 6 A | 1 A/nsec |
|  | $VR_D$ | 1.2 V | 7.2 A | 1 A/nsec |
|  | $VR_F$ | 1.8 V | 0.65 A | 0.025 A/nsec |
|  | $VR_E$ | 1.3 V | 0.5 A | 1 A/nsec |
|  | $VR_H$ | 3.3 V | 0.24 A | 0.36 A/nsec |
| Memory | $VR_F$ | 1.8 V | 0.65 A | 0.025 A/nsec |
|  | $VR_G$ | 0.9 V |  |  |
| HDD | DC-to-DC | 12 VDC |  |  |
|  | $VR_I$ | 5 V |  |  |
| Other | DC-to-DC | 12 VDC |  |  |
|  | $VR_I$ | 5 V |  |  |
|  | $VR_H$ | 3.3 V | 0.24 A | 0.36 A/nsec |

Many circuits of the computing server 101 should remain operational during dropouts or loss of the input source. Often, when a dropout is a short term event (e.g., less than 200 ms), the ability to continue powering the circuits is accommodated by capacitive energy storage and associated circuitry. Long term tolerance to a loss of input may be provided by other sources such as a battery, and in these applications some internal capacitive energy storage can assist in providing smooth source transitions.

In conventional systems, the output of the first boost stage 107 is regulated during normal operation. The first boost stage 107 output represents the highest operating voltage of the DC-to-DC power converter 111 that follows. When the input source to the first boost stage 107 is lost, however, the first boost stage 107 isolates the energy storage circuit 113 from the input line, and the energy storage circuit 113 becomes the source input to the DC-to-DC power converter 111. As the DC-to-DC power converter 111 draws energy, the voltage of the energy storage circuit 113 declines. The length of time over which the entire power architecture can maintain a regulated output voltage is proportional to both the capacitive value of the energy storage circuit 113 and the input voltage range of the DC-to-DC power converter 111.

In the computing server 101 of FIG. 1A, energy storage circuit 113 provides an output capacitance for the first boost stage 107. Generally, the energy storage circuit 113 is a single capacitor. The output capacitance of the energy storage circuit 113 is generally sized as a function of the energy required to meet the design parameters for hold-up when the input source supply is lost. A similar function is also used to size the output capacitance of other commonly used solutions for DC input converters with particular hold-up requirements.

During the hold-up interval, i.e., when the input voltage source is lost, the energy storage circuit 113 voltage will decay. That is, since the energy storage circuit 113 is no longer sourced via the boost stage 107, and since the energy storage circuit 113 further continues to supply the second DC-to-DC converter 111, the charge in the energy storage circuit 113 will begin to be released.

BRIEF SUMMARY

The various power architecture embodiments described herein generally relate to the use of a power supply having a first power conversion stage, which, in many cases, is a voltage boost topology stage. The first power conversion stage may be followed by one or more subsequent power conversion stages. The subsequent power conversion stages provide isolation between the primary source and the output load voltages and also may provide regulation of the output load voltages.

The first power conversion stage utilizes an energy storage mechanism to hold-up and filter the input source voltage during both normal operation and when the input power source is lost. The first power conversion stage described herein typically has at least two energy storage circuits as part of the energy storage mechanism; an operating energy storage circuit and a hold-up energy storage circuit.

The power architecture generally provides for a first power conversion stage whose output remains essentially constant during both normal operation and during the hold-up operation (i.e., when the input source is lost). The essentially constant output of the first power conversion stage permits a subsequently coupled DC-to-DC isolating conversion stage to operate as a simple chopper stage wherein input voltage variation is generally not accounted for. Accordingly, the first power conversion stage can provide improved utilization of an energy storage component for hold-up, simplification of the overall power architecture, and improved efficiency of the overall power architecture.

A power architecture may be summarized as including an electronic switch circuit and a power conversion circuit. The power conversion circuit may include an input node configured to receive an input power signal, an output node configured to supply an intermediate power signal, an operating capacitance node configured to couple an operating capacitive device between the output node and a power rail, and a hold-up capacitance node. The hold-up capacitance node may be coupled via the electronic switch circuit to the output node when the electronic switch circuit is in a first state, and the hold-up capacitance node may be alternatively coupled via the electronic switch circuit to the input node when the electronic switch circuit is in a second state. The power architecture may also include a control circuit configured to direct the electronic switch circuit into the first state or the second state in response to the input power signal.

A method of maintaining an output voltage level of a power architecture may be summarized as including receiving a first input signal at an input node of a power conversion stage, converting the first input signal into a first intermediate signal with the power conversion stage, and supplying the first intermediate signal to an output node of the power conversion stage, the first intermediate signal having a particular voltage level. The method may further include charging a hold-up capacitance, detecting a loss of the first input signal, and coupling the hold-up capacitance to the input node in response to the detection of the loss of the first input signal. The hold-up capacitance provides a second input signal to the power conversion stage and the power conversion stage supplies a second intermediate signal to the output node of the power conversion stage. The second intermediate signal has a voltage level that is substantially the same as the particular voltage level.

A boost converter power supply may be summarized as including a boost stage configured to convert an input signal having a first voltage level into an intermediate signal having a second voltage level. The second voltage level is higher than the first voltage level. The boost converter may also include an operating capacitor fixedly electrically coupled to an output node of the boost stage, and a hold-up capacitor conditionally electrically coupled to either the output node of the boost stage or an input node of the boost stage. A detection circuit may be configured to provide a failure signal upon loss of the input signal, and a switching circuit may be responsive to the failure signal. The switching circuit is operable to electrically couple the hold-up capacitor to the output node of the boost stage when the failure signal has a first state, and is alternatively operable to electrically couple the hold-up capacitor to the input node of the boost stage when the failure signal has a second state.

A boost converter power supply may be summarized as including a boost stage configured to convert an input signal having a first voltage level into an intermediate signal having a second voltage level, the second voltage level higher than the first voltage level; an operating capacitor fixedly electrically coupled to an output of the boost stage; a hold-up capacitor conditionally electrically coupled to either the output of the boost stage or an input of the boost stage; a detection circuit configured to provide a failure signal upon loss of the input signal; and a switching circuit responsive to the failure signal and operable to electrically couple the hold-up capacitor to the output of the boost stage when the failure signal has a first state and alternatively electrically couple the hold-up capacitor to the input of the boost stage when the failure signal has a second state.

The boost converter power supply may further include a load electrically coupled to the output of the boost stage to use energy supplied by the boost stage.

The boost converter power supply may further include an isolating stage electrically coupled to the output of the boost stage to further convert the intermediate signal into an output signal level having a third voltage level. The isolating stage may be an unregulated DC-to-DC converter. The isolating stage may be a chopper circuit.

A power architecture may be summarized as including an electronic switch circuit; a power conversion circuit, the power conversion circuit including: an input node to receive an input power signal; an output node to supply an intermediate power signal; an operating capacitance node to electrically couple an operating capacitive device between the output node and a power rail; and a hold-up capacitance node electrically coupleable via the electronic switch circuit to the output node when the electronic switch circuit is in a first state, the hold-up capacitance node alternatively electrically coupleable via the electronic switch circuit to the input node when the electronic switch circuit is in a second state; and a control circuit coupled to control the electronic switch circuit into the first state or the second state in response to the input power signal.

The power architecture may further include the operating capacitive device; and a hold-up capacitive device electrically coupled between the hold-up capacitance node and the power rail.

The power architecture may further include a power isolating circuit, the power isolating circuit having: an input node electrically coupled to the output node of the power conversion circuit; and an output node to supply an output power signal from the power architecture, wherein the power isolating circuit is a DC-to-DC power supply. The power conversion circuit may be a boost converter. The boost converter may be a power factor correction boost converter. The power conversion circuit may be a SEPIC converter. The power conversion circuit may be a buck-boost converter. The power isolating circuit may be a chopper circuit. The control circuit may include an under voltage lockout circuit.

The power conversion circuit may further include a slow transient response circuit; and a switching circuit responsive to the control circuit, the switching circuit configured to couple the slow transient response circuit to the input power signal when the control circuit directs the electronic switch circuit into the first state and further configured to isolate the slow transient response circuit from the input power signal when the control circuit directs the electronic switch into the second state. The hold-up capacitive device is a capacitor having substantially larger capacitance than the operating capacitive device.

The power conversion circuit may further include a control loop operable in a slow transient response mode and a fast transient response mode; and a switching circuit responsive to the control circuit, the switching circuit configured to enable the slow transient response mode of the control loop when the control circuit directs the electronic switch circuit into the first state and further configured to enable the fast transient response mode when the control circuit directs the electronic switch into the second state. The switching circuit responsive to the control circuit may be part of an analog feedback control circuit, implemented with physical components, or part of a digital feedback control circuit implemented with lines of code. The operating capacitance may be substantially smaller than the hold-up capacitance.

A method of maintaining an output voltage level of a power architecture may be summarized as including receiving a first input signal at an input node of a power conversion stage; converting the first input signal into a first intermediate signal by the power conversion stage; supplying the first intermediate signal to an output node of the power conversion stage, the first intermediate signal having a particular voltage level; charging a hold-up capacitance; detecting a loss of the first input signal; and electrically coupling the hold-up capacitance to the input node in response to the detection of the loss of the first input signal, the hold-up capacitance providing a second input signal to the power conversion stage and the power conversion stage supplying a second intermediate signal to the output node of the power conversion stage, the second intermediate signal having a voltage level that is substantially the same as the particular voltage level.

The method of maintaining an output voltage level of a power architecture may further include electrically coupling the hold-up capacitance to the output node of the power conversion stage prior to the detecting of the loss of the first input signal; filtering the first intermediate signal with the hold-up capacitance when the hold-up capacitance is coupled to the output node of the power conversion stage; and supplying the second input signal when the hold-up capacitance is electrically coupled to the input node until the energy in the hold-up capacitance is substantially depleted.

The method of maintaining an output voltage level of a power architecture may further include electrically coupling a power isolating circuit to the output node of the power conversion stage; receiving the first intermediate signal or the second intermediate signal at an input node of the power isolating stage; and supplying an isolated power signal at an output node of the power isolating stage. Supplying the isolated power signal may include chopping the first intermediate signal or the second intermediate signal received at the input node of the power isolating stage. The converting may include increasing the voltage level of the first input signal or the second input signal. The converting may includes decreasing the voltage level of the first input signal or the second input signal. Receiving a first input signal may include receiving a rectified AC signal and the hold-up capacitance providing a second input signal includes providing a DC signal. The converting may include providing a transient response to the first input signal sufficient to maintain a predetermined power factor correction.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1A is a schematic diagram of a conventional computing server.

FIG. 2C is a schematic diagram of a conventional simplified single-stage buck converter.

FIG. 2D is a schematic diagram of a conventional simplified single-stage buck-boost converter.

FIG. 2E is a schematic diagram of a conventional simplified SEPIC.

FIG. 4A is a schematic diagram of a power architecture having an energy storage circuit according to one illustrated embodiment of the present disclosure.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power conversion topologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1B:
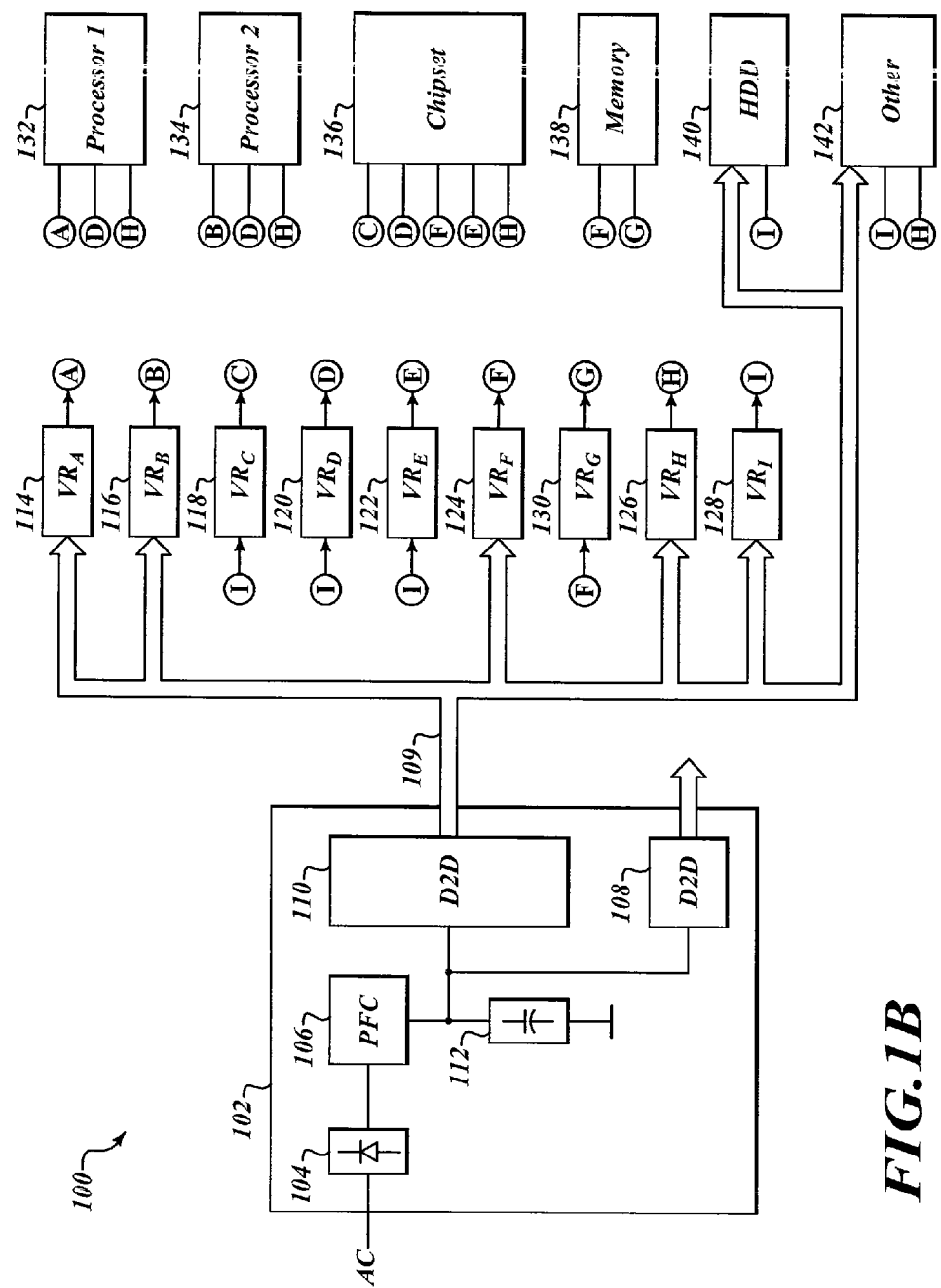
FIG. 1B is a schematic diagram of a computing server, particularly illustrating one embodiment of a power architecture of the computing server.

FIG. 1B is a schematic diagram of a computing server 100, particularly illustrating one embodiment of a power architecture of the computing server 100. The power architecture of FIG. 1B illustrates adaptations to the conventional computing server 101 power architecture of FIG. 1A. With reference to the computing servers of FIGS. 1A and 1B, similar elements are illustrated as having the same reference designations.

FIG. 1B illustrates a computing server 100 and particularly shows the power architecture of the computing server. An alternating current (AC) is input to an initial rectifier circuit 104 of a main power supply 102. The output of the rectifier circuit 104 is input to a power factor correction circuit (PFC) 106. The output of the power factor correction circuit 106 is coupled to a first DC-to-DC power supply 108, a second DC-to-DC power supply 110, and to an energy storage circuit 112. In the computing server embodiment 100 of FIG. 1B, the main power supply 102 provides two outputs for the computing server 100. A first output, produced by the first DC-to-DC power supply 108, is a 5V standby voltage. A second output, produced by the second DC-to-DC power supply 110, is a 12V supply voltage. The 12V supply voltage in the embodiment of FIG. 1B is used to supply several power distribution circuits of the computing server 100.

In a power architecture design, various energy storage circuits generally include particular capacitances. An operating or operational capacitance or the like refers to the value and other characteristics (e.g., voltage rating, ESR, etc) of the capacitance that are determined to provide substantially normal operation of the power converter stage. A hold-up capacitance or the like refers to the additional capacitance and other characteristics that are determined to substantially maintain power converter outputs during loss of input for a particular duration.

For example, in the power architecture design of FIG. 1B, the size of the energy storage circuit 112, e.g., a capacitor, is determined both by the designed hold-up energy (joules) and the designed regulation voltage range of the second DC-to-DC converter 110 stage. The designed regulation voltage range of the DC-to-DC converter 110 is the minimum to maximum range of voltage input that the DC-to-DC converter 110 can accept while maintaining the ability to regulate its output voltage within design tolerance. A wide DC-to-DC converter 110 stage input regulation range will tend to reduce the energy storage circuit 112 size, but a wide input regulation range will also tend to compromise the efficiency, volume, and component rating parameters (e.g., voltage and current rating) of the DC-to-DC converter 110 stage. In addition, the wide input regulation range is often required only during hold-up, which is an infrequent event. Nevertheless, the design approach chosen for the power architecture to compensate for the loss of source power during a hold-up condition will impact the efficiency, the size, and the overall power supply cost even though those particular features of the design, including associated components, are not used during normal operation.

Stated differently, in many power architecture designs, a subsequent power stage (DC-to-DC converter 110) is designed to maintain its output when the preceding boost power factor correction circuit 106 loses its input. In this hold-up condition, the energy storage circuit 112 decays due to the loss of source, which results in a wide operating range of input to the subsequent power stage. Because of the wide operating range, the subsequent power stage is often designed to accommodate regulation simply for hold-up. Thus, the power architecture operates less efficiently in normal operation and has higher voltage rated semiconductors and larger output inductive-capacitive (L-C) filtering components than might otherwise be required.

Accordingly, it is now recognized that if regulation during hold-up is a less dominant design characteristic, then a second stage (e.g., DC-to-DC converter 110 stage), which follows a power factor correction circuit 106, can be designed more efficiently or even eliminated. For example, if output voltage regulation is less necessary, then the second stage could be designed as a simple chopper circuit for many applications.

A chopper circuit is a typical implementation of an unregulated DC-DC converter. In some embodiments, a chopper circuit generally has an unregulated, double-ended, isolated topology wherein a transformer flux is actively driven in both directions symmetrically about zero, operating at or near 100% duty cycle. A simple chopper circuit may reduce the size and overall power supply cost.

While a simple chopper circuit is generally effective during normal operation, other circuitry can be added to operate the chopper circuit in a controlled fashion during start up or load faults. The additional circuitry is particularly useful when the preceding stage includes a boost converter. In some cases, during start up or load faults, the chopper circuit may even be replaced with different isolating circuitry.

Alternatively, the second stage may not even be present in some applications. Instead, the output of the power factor correction circuit 106 may directly supply output to a load in applications where isolation from the input source is not part of the design.

Intermediate bus architecture (IBA) applications or other applications not requiring tight output regulation can benefit from using a simple chopper circuit. In these applications the opportunity to maintain a constant output from the first stage during hold-up is beneficial and can result in improved efficiency and reduced converter volume. Additionally, the opportunity to improve system efficiency with an improved power architecture will also benefit computing based applications where several distinct voltages are supplied to a variety of components or subsystems. An example of a system having an improved power architecture is described herein for the computing server system 100 shown in FIG. 1B.

FIG. 1B shows an improved power architecture 100, and in particular a main power supply 102, according to one illustrated embodiment. The main power supply 102 of the improved power architecture employs an energy storage circuit 112 for hold-up so as to reduce overall volume of the circuit. Further, the improved power architecture reduces the input regulating range necessary for a subsequent power stage such as DC-to-DC converter 110 that follows the boost stage (e.g., power factor correction circuit 106). Instead of a wide input range, the subsequent power stage can be designed as a regulating stage normally operating at a more narrow duty cycle.

Figure 2A:
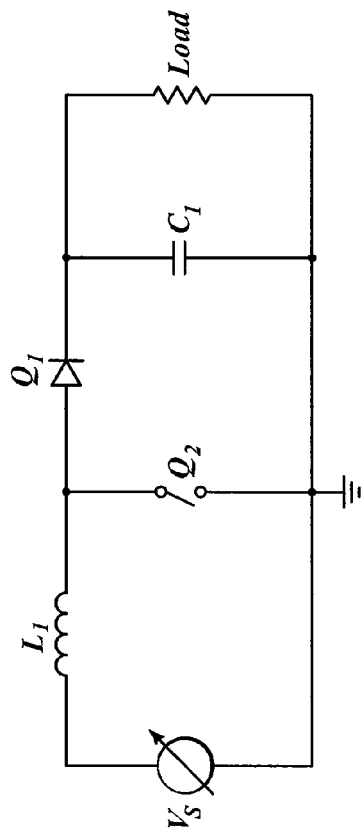
FIG. 2A is a schematic diagram of a conventional simplified single-stage boost converter.
Figure 2B:
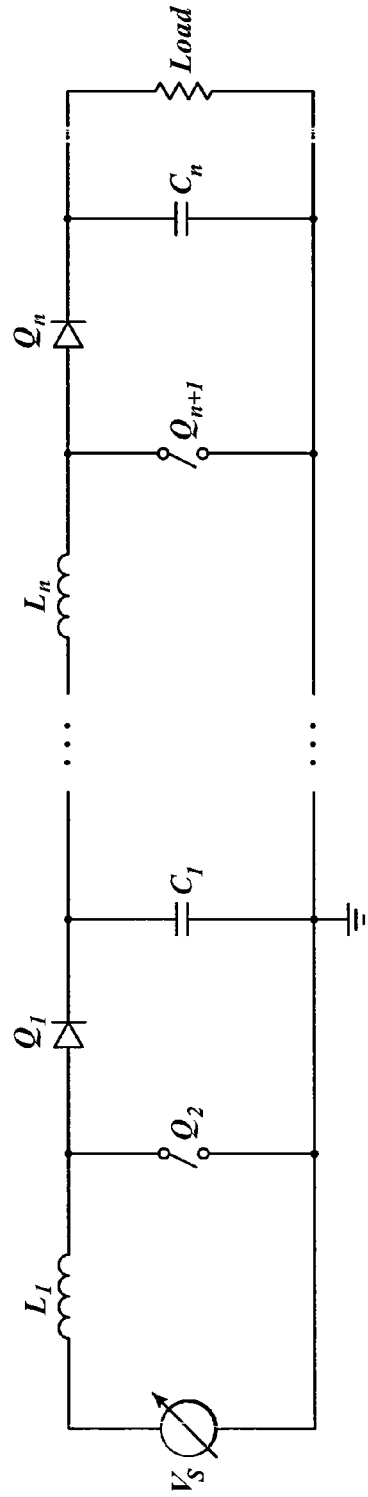
FIG. 2B is a schematic diagram of a conventional simplified multi-stage boost converter.

With further respect to FIG. 1B, an embodiment of power factor correction circuit 106 is implemented by a boost topology. Suitable non-limiting embodiments of boost converters are illustrated in FIGS. 2A and 2B. A suitable non-limiting embodiment of a buck converter is illustrated in FIG. 2C. And a suitable non-limiting embodiment of a buck-boost converter is illustrated in FIG. 2D.

FIG. 2A shows a simplified single-stage boost converter 105a. A rectified AC source or a DC source $V_S$ is permitted to energize inductor L1 when switch Q2 is closed. Typically, switch Q2 will be opened and closed at a clocked interval referred to as switching frequency. When switch Q2 is opened, the absorbed energy from inductor L1 passes through switch Q1 and is stored in capacitor C1. The operating parameters of supply $V_S$, the size of inductor L1, the duty cycle (on to off ratio within a clocked interval) of Q2, and the size (volume) of C1 will determine how much boosted voltage and current are supplied to the Load.

FIG. 2B shows a simplified multi-stage boost converter 105b. Additional boost stages include sequentially numbered inductors to Ln, sequentially numbered switches Qn to Qn+1, and sequentially numbered capacitors to Cn. The multi-stage boost converter 105b has operating principles similar to that of the single stage boost converter 105a of FIG. 2A.

FIG. 2C shows a simplified single-stage buck converter 105c. A rectified AC source or a DC source $V_S$ energizes inductor L1 when switch Q2 is closed. When switch Q2 is opened, the energy from capacitor C1 passes through switch Q1 and through inductor L1. The operating parameters of supply $V_S$, the size of inductor L1, the duty cycle of Q2, and the size of C1 will determine how much stepped-down voltage and current are supplied to the Load.

FIG. 2D shows a simplified single-stage buck-boost converter 105d. A rectified AC source or a DC source $V_S$ energizes inductor L1 when switch Q2 is closed. When switch Q2 is opened, the energy from capacitor C1 passes through switch Q1 and through inductor L1. The output voltage of the buck-boost converter 105d is inverted from the input voltage. Depending on the switching duty cycle of Q2, the output voltage of the buck-boost converter 105d will be stepped up, stepped down, or at the same level as the input voltage. In addition, the operating parameters of supply $V_S$, the size of inductor L1, and the size (volume) of C1 will also affect how much voltage and current are supplied to the Load.

FIG. 2E shows a simplified single-ended primary inductor converter (SEPIC) 105e. The SEPIC also combines functionality of both the buck and the boost converters. Depending on the duty cycle of the SEPIC electronic switch, the output voltage of the SEPIC 105e will be higher, lower, or the same as the input voltage V. In addition, the operating parameters of the input supply, the size of inductors, and the size of capacitances will also affect how much voltage and current are supplied to the Load.

In the simplified SEPIC illustration of FIG. 2E, a rectified AC source or a DC source $V_S$ energizes inductor L1. An AC coupling capacitor C2 maintains a voltage equal to the input voltage $V_S$. When switch Q2 is closed, the polarity of capacitor C2 reverse biases switch Q1, which blocks any $V_S$ energy transfer to the Load. Also when switch Q2 is closed, current circulates between the AC coupling capacitor C2 and the output inductor L2, which are now in parallel. Inductor L1 is being charged by input $V_S$ and inductor L2 is being charge by coupling capacitor C2. Since switch Q1 is reverse biased, current supplied to the Load is provided only by the output capacitor C1. When switch Q2 is opened, input inductor L1 reverses polarity, which forces current through the AC coupling capacitor C2 and the forward biased switch Q1 diode into the output capacitor C1 and the Load.

The power factor correction circuit 106 in the embodiment of FIG. 1B produces an output voltage higher than the peak of the rectified AC input using, for example, the boost converters shown in FIGS. 2A-2B. It is recognized however, that the power factor correction circuit 106 can operate according to different principles as well. For example, the power factor correction circuit 106 can be implemented with a buck topology as in FIG. 2C, a buck-boost topology as in FIG. 2D, a SEPIC topology as in FIG. 2E, or some other switched mode topology. In fact, the power factor correction circuit 106 can be implemented with any suitable power conversion topology.

Following the power factor correction circuit 106, a DC-to-DC power converter 110 operates as an in-series power isolating and conversion stage for an intermediate bus voltage in the computing server 100 example. Alternatively, the DC-to-DC power converter 110 may operate directly as a load voltage supply or in some other configuration. In many cases, the DC-to-DC power converter 110 is galvanically isolated from the power factor correction circuit 106.

It has now been recognized that the input voltage range of the DC-to-DC power converter 110 is a significant factor related to the utilization of the energy storage circuit 112. In fact, a wide input voltage range for the DC-to-DC power converter 110 will lead to an increased utilization of the energy storage circuit 112, but the wide input voltage range will adversely impact the efficiency of the DC-to-DC power converter 110.

Figure 3:
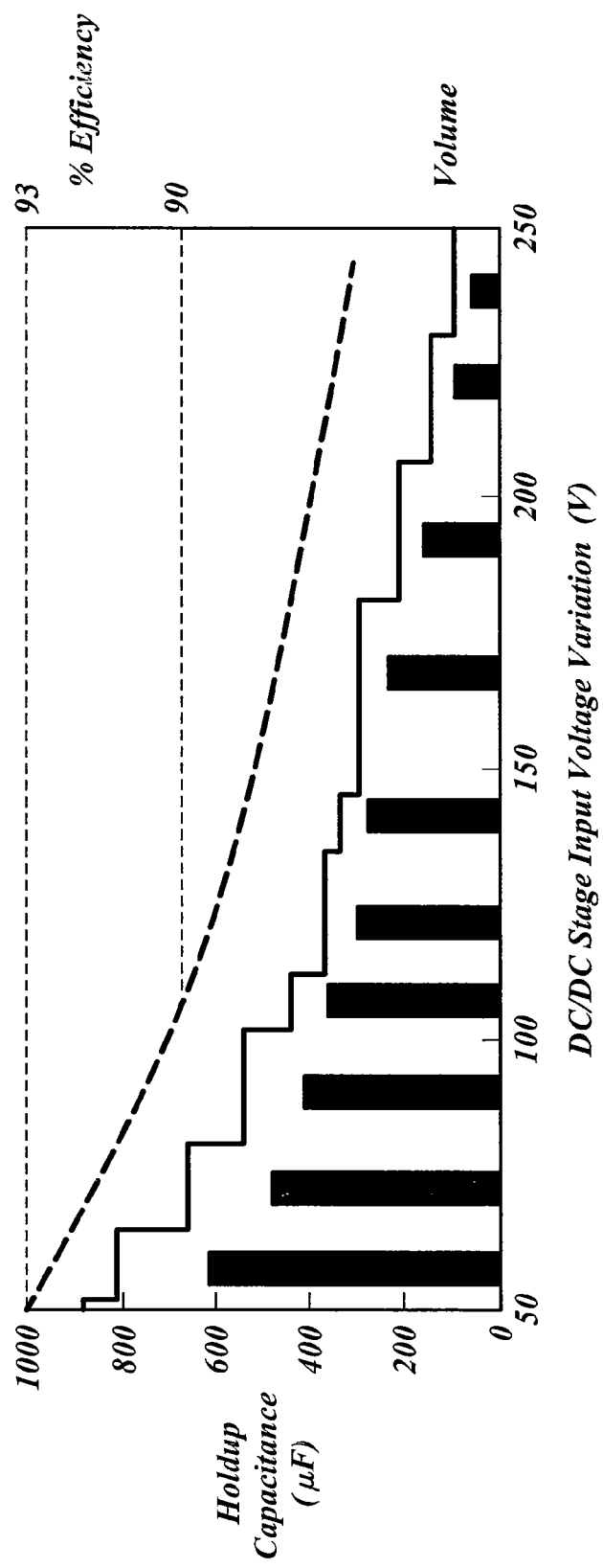
FIG. 3 is a graph that plots a hold-up capacitance value against a following stage DC-to-DC power supply input voltage range.

FIG. 3 shows a plot of a hold-up capacitance value against a DC-to-DC power supply input voltage range. The hold-up capacitance value may be provided by an energy storage circuit 112. As shown in the embodiment of FIG. 3, the overall capacitance value of the energy storage circuit 112 may range from 0 to 1000 microfarads (µF). Several vertical bars in the graph of FIG. 3 illustrate different amounts of capacitance. For example, a first, left-most vertical bar represents a capacitance of 600 µF. A sixth, right-most vertical bar represents a capacitance of 200 µF. A segmented line roughly follows the volume of the illustrated capacitance values.

With respect to the vertical bars in FIG. 3, which represent overall capacitance of the energy storage circuit 112, it is recognized that an increase in capacitance will require capacitors having larger volume. The use of larger capacitors in the energy storage circuit 112 is generally undesirable. A capacitance having larger volume will need more surface area on a circuit board or within an integrated assembly. The larger volume may also require different processing to build, mount, test, service, and the like. In addition, the larger volume by itself, and in further combination with any specific processing, leads to an increased cost of the power architecture.

FIG. 3 also shows the vertical bars spread across the horizontal axis of the graph. The horizontal axis represents the input voltage range to the DC-to-DC power converter 110 and spans from 50 volts to 250 volts. In the embodiment of FIG. 3, a DC-to-DC power converter 110 produces 700 watt output at 28 VDC when operating from an input that is normally regulated at 400 VDC from the power conversion first stage. Desirably, the DC-DC converter will operate at less than 400 VDC during interruptions of the input AC source that supplies the power conversion stage. The efficiency of the DC-DC converter drops linearly as the DC-DC converter is designed to operate over wider input ranges. The stepped line of FIG. 3 represents a desired capacitive value on the left axis axis, and the solid vertical bars represent the corresponding capacitor volume on the right axis. Selection of the particular capacitive volumes shown by the vertical bars will achieve the required holdup time. In FIG. 3, the stepped line is so illustrated due to limited physical values and corresponding sizes for capacitors of a particular technology. That is, capacitors are typically not available for every integer value.

In the example of FIG. 3, the first, left-most vertical bar illustrates that for the DC-to-DC power converter 110 having a narrow input voltage range of 60 volts, the energy storage circuit 112 may have a selected capacitance of 600 µF. Similarly, the last, right-most vertical bar illustrates that for the DC-to-DC power converter 110 having a wide input voltage range of 240 volts, the energy storage circuit 112 may have a selected capacitance of only 100 µF.

Prominently, a sloping, dashed line on the graph of FIG. 3 also illustrates the operating efficiency of the DC-to-DC power converter 110 under different alternative conditions. It is clear in the graph, as shown by the downward sloping, dashed efficiency line, that selecting a narrow input voltage range for the DC-to-DC power converter 110 and further selecting a large capacitance value for the energy storage circuit 112 will generally result in a more efficient power converter architecture. It is also evident that as the input voltage range is increased, and as the energy storage circuit 112 capacitance decreases, the efficiency of the power converter architecture will decline as the efficiency of the DC-DC converter declines.

Several alternative architectures have been tested. The compilation of the tested architectures has resulted in the findings illustrated in FIG. 3. As noted herein, and as shown in FIG. 3, one way to design an efficient DC-to-DC power converter 110 is to implement an energy storage circuit 112 having a large capacitance. It is desirable, however, for the reasons noted herein, to reduce the size of the energy storage circuit 112 capacitance while at the same time maintaining a desirable efficiency of the DC-to-DC power converter 110.

FIG. 4A shows a power architecture 172 according to one illustrated embodiment having an energy storage circuit 162. The power architecture 172 of FIG. 4A may be employed in an embodiment of computing server 100 as shown in FIG. 1B. That is, the power conversion stage 144 of FIG. 4A may be used in the power factor correction stage 106. The isolating conversion stage 146 may be used in DC-to-DC power converter 110. The energy storage circuit 162 may be used in energy storage circuit 112.

In the embodiment of FIG. 4A, an input voltage $V_S$ is applied to an input node of the power conversion stage 144 and to an under voltage lockout circuit (UVLO) 148. The input voltage $V_S$ is also sensed on an electronic switch 158 (e.g., a diode), but the electronic switch 158 is generally reverse biased so as to block the input voltage signal.

An output node of the power conversion stage 144 is coupled to an electronic switch 152, an operating capacitance device 160, and to an input node of an isolating conversion stage 146. The output of the power conversion stage 144 will supply an intermediate power signal $V_{INT}$ if there are subsequent power stages coupled to the output node or an output power signal if there is only load circuitry coupled to the output node. That is, it is understood that the isolating conversion stage 146 of FIG. 4A is an optional stage.

An output node of the isolating conversion stage 146 is a source node by which a power supply signal $V_O$ may be supplied to downstream loads. That is, in power architectures where the isolating conversion stage 146 is present, the output node of the power architecture supplies an output voltage signal $V_O$ to downstream loads. In power architectures where the isolating conversion stage 146 is not present, the output node of the power architecture supplies an output voltage signal $V_{INT}$ to downstream loads.

In some cases, optional voltage feedback loop 145 setpoint signals of the power architecture output are supplied back to either or both of the isolating conversion stage 146 and the power conversion stage 144. For example, in some cases, regulation of the output signal $V_O$ is accomplished within the isolating conversion stage 146. In other cases, such as when the isolating conversion stage is merely an unregulated chopper circuit, regulation of the output signal $V_O$ is accomplished with power conversion stage 144. Alternatively, when the isolating conversion stage 146 regulates its own output or when the power conversion stage 144 directly supplies a load, the voltage feedback of the power conversion stage may be connected directly to the power conversion stage output node as shown in the optional feedback connection 145 of FIG. 4A.

In FIG. 4A, operational capacitance 160 is coupled between the output of the power conversion stage 144 and a common power rail or plane of the power architecture 172. Electronic switches 152, 154 are coupled to a hold-up capacitance 156 and the hold-up capacitance 156 is further coupled to the common power rail. In many cases, such as when the input to the power conversion stage is a DC signal, the common power rail is a ground plane. In other cases, such as when the input to the power conversion stage is a rectified AC signal, the common power rail is merely at a different voltage level than other rails in the power architecture 172.

In some embodiments, the input and output to the power conversion stage 144 are tied to the common power rail. In some embodiments, the input to the isolating conversion stage 146 is tied to the common power rail, but the output of the isolating conversion stage 146 is tied to a different power rail. In some embodiments, the common power rail provides a return path for input signal $V_S$ and the output signal at node $V_{INT}$.

The output of the under voltage lock out circuit 148 is asserted when the input voltage to the circuit falls below a particular threshold. In some embodiments, such as when the power conversion stage 144 receives a rectified AC signal at its input, particular input voltage monitoring circuits and/or current monitoring circuits that sense signals either before or after rectification of the AC signal may be used to detect failure of the input source. These circuits may use one or more differential amplifiers to provide half-wave or full-wave supply failure detection via signal averaging and threshold detection. In other embodiments, such as when the power conversion stage receives a DC signal at its input, a simple comparator and reference voltage may be used to provide supply failure detection. In still other cases, different circuits may provide supply failure detection.

In some embodiments, the under voltage lock out circuit 148 output remains asserted until the input voltage to the circuit rises above a particular threshold. In other embodiments, the under voltage lock out circuit 148 output will remain asserted for some additional time period after power rises above a particular threshold. In still other cases, the under voltage lock out circuit 148 operates differently to usefully provide assertion and reset signals when a low voltage input state is detected. The output of the under voltage lock out circuit 148 is coupled to a supply fail detector stage 150.

The supply fail detector 150 may be any conventional electronic circuit that detects the loss of the AC, rectified AC, or DC input source V. For example, in some cases, a comparator circuit that uses a reference voltage may be employed to compare the input source to the reference voltage and assert an output when the input source is lost. In other cases, the input source may bias an electronic switch in one direction while a charged capacitive device stores a charge. Upon loss of the input source, the electronic switch may be biased in the other direction and the now discharging capacitive device provides the power fail signal. In still other cases, a differential amplifier circuit may provide the power fail detection signal.

In the embodiment of FIG. 4A, the supply fail detector 150 provides an output signal to electronic switch 154 and, in some cases, an output signal to electronic switch 152. In some cases, the same output signal is provided to both switches. In some cases, a signal supplied to one electronic switch 152 is the inverse of a signal supplied to the other electronic switch 154. In still other cases, the two output signals are independent of each other. Some embodiments of the electronic switches 152, 154 are further described herein.

In the embodiment of FIG. 4A, the supply fail detector 150 also provides an output signal to the power conversion stage 144. In some cases, the signal provided to the power conversion stage 144 is the same as one or both of the output signals provided to electronic switches 152, 154. In other cases, however, the output signal to the power conversion stage 144 is different. In some cases, the output signal to the power conversion stage 144 is asserted before the signals to one or both of electronic switches 152, 154 are asserted.

The energy storage circuit 162 coupled between the power conversion stage 144 and the isolating conversion stage 146 in FIG. 4A is believed to be a new type of energy storage circuit 162. In the present embodiments, the energy storage circuit 162 is generally capacitive in nature and formed from two or more capacitors or capacitor networks. In some cases, capacitors are connected in series to increase the stored voltage capability of the capacitive network. A series connection, however, decreases the capacitance of the network. In other cases, individual capacitors or strings of capacitors in series are connected in parallel. A parallel network of capacitors will increase the overall capacitance value of the network.

In at least some of the embodiments described herein, the energy storage circuit 162 may include capacitors individually, in series, and in parallel. In addition, the capacitors will act in cooperation with other circuitry to perform energy storage and subsequent energy delivery functions.

The power architecture 172 of FIG. 4A provides for a power conversion stage 144 whose output remains essentially constant during both normal operation and during hold-up operation (i.e., when the input source is lost). The essentially constant output permits the subsequently coupled DC-to-DC isolating conversion stage 146 to operate as a chopper stage wherein input voltage variation is generally not accounted for. Alternatively, the isolating conversion stage 146 can include a circuit that operates as a simple chopper during normal operation and operates in a controlled fashion to limit inrush current during start-up or load faults. The power architecture 172 of FIG. 4A also provides for very high utilization of the energy storage circuit 162.

FIG. 4A also illustrates an energy storage circuit 162 expanded into multiple sections. As shown in greater detail than is the energy storage circuit 112 of FIG. 1B, an output capacitance is divided into at least two separate parts: an operating capacitance 160 and a hold-up capacitance 156. The operating capacitance, which is shown as a capacitive network including both operating capacitance 160 and hold-up capacitance 156, supports normal converter operation. The hold-up capacitance 156 supports hold-up operation.

Operating capacitance 160 is coupled to the power conversion stage 144 output node. The operating capacitance 160 will function in a similar fashion to the capacitances of FIGS. 1A, 1B, and 2A-2E. That is, operating capacitance 160 is an energy storage component particularly useful for generating a boost or buck voltage for power conversion stage 144 and for filtering the output of power conversion stage 144 during normal operation.

In the embodiment of FIG. 4A, hold-up capacitance 156 is coupled to the power conversion stage 144 output node through an electronic switch 152. During normal operation, hold-up capacitance 156 is electronically connected to the power conversion stage 144 output node. Thus, during normal operation, hold-up capacitance 156 is placed in parallel with operating capacitance 160. The parallel combination of the two capacitances increases the total output capacitance of the power conversion stage 144. It is noted that other configurations for hold-up capacitance 156 with operating capacitance 160 are also permitted.

Hold-up operation is entered when the supply fail detector 150 determines that the input supply signal $V_S$ to the power architecture 172 falls outside of a predetermined threshold. In the embodiment of FIG. 4A, hold-up operation is entered when the supply fail detector 150 determines that the input supply signal $V_S$ is lower than a predetermined undervoltage threshold. During hold-up operation, the electronic switch 152 is opened and the electronic switch 154 is closed.

The changed states of electronic switches 152, 154 alter the configuration of the energy storage circuit 162. During hold-up operation, hold-up capacitance 156 is coupled to the input node of power conversion stage 144 instead of the output node. If the power conversion stage 144 in FIG. 4A is a boost type topology, the hold-up capacitance 156 can be discharged to nearly zero volts while maintaining an essentially regulated output, which is then input to the following DC-to-DC stage (e.g., isolating conversion stage 146).

The separation of capacitance in the energy storage circuit 162, along with the conditional coupling of hold-up capacitance 156, may provide advantages to the power architecture 172 of FIG. 4A. For example, the separation now provides higher utilization of the energy storage capacitance. In addition, smaller capacitances may be used for a particular hold-up time requirement. Further, overall efficiency of the power architecture 172 may be improved by reducing the input voltage variation that the isolating converter 146 may be designed to operate over. In addition, the use of one or more simple DC-to-DC following stages, for example a chopper stage, as an isolating conversion stage 146 may provide lower cost and higher reliability designs.

With further reference to FIG. 4A, when the input signal $V_S$ is a DC signal, operational capacitance 160 can have a smaller value than in conventional circuits. During normal operation, when input $V_S$ is present, the lower value of operational capacitance 160 can be coupled with hold-up capacitance 156 to provide sufficient operational energy storage and transfer. Further, during hold-up operation, when input $V_S$ is lost and power architecture 172 is operating from a DC input signal provided by hold-up capacitance 156, the lower value of operational capacitance 160 is still sufficient.

That is, if hold-up capacitance 156 is coupled to the power conversion 156 output through a low impedance path during normal operation, then hold-up capacitance 156 can be used as additional operating capacitance during normal operation when a higher overall operating capacitance value is often desired. Configuring the power architecture 172 in the manner typically provides more effective overall operating capacitance for normal operation, and the operating capacitance 160 may be sized smaller but still sufficient for hold-up operation.

In FIG. 4A, and in other figures, some components are illustrated as being directly connected to other components. For example, operating capacitance 160 in FIG. 4A is illustrated as being directly connected between the power conversion stage 144 output node and the isolating conversion stage 146 input node. It is to be appreciated, however, that intervening components may be permitted in some embodiments. For example, additional circuitry that isolates the power conversion stage 144 from the isolating conversion stage 146 may be used. As another example, resistive divider networks may be used to tap different output levels. Other embodiments with different components are also permitted.

If the power architecture 172 of FIG. 4A is supplied with a rectified AC input at the source $V_S$, it is expected that the energy storage circuit 162 will be designed with a higher amount of operating capacitance than if the power architecture 172 is supplied with a pure DC input. In AC applications, the higher amount of operating capacitance is chosen for many reasons. For example, achieving power factor correction during normal (non-hold-up) operation often requires the design of a low bandwidth, relative to line frequency, power conversion stage 144. A consequence of the low bandwidth is increased line frequency ripple current from the rectified AC input, which may be smoothed with a higher value of capacitance to achieve a desired ripple voltage at $V_{INT}$.

In one more example, the amount of effective operating capacitance chosen in AC applications during normal operation should be sufficient to limit the droop on the output of power conversion stage 144 ($V_{INT}$) during the period required for detection and switchover time of the hold-up capacitance 156 coupling to the input node (hold-up operation) of the power conversion stage 144 upon loss of source $V_S$. That is, power conversion stage 144 output voltage droop occurs upon the loss of input source. The voltage droop is typically proportional to the effective operating capacitance, which in normal mode may include both the operating capacitance and the hold-up capacitance, and the load power divided by the efficiency of the following DC-to-DC isolating conversion stage(s) 146. The time required to detect a loss of source $V_S$ is generally longer for AC source applications since the input voltage and current vary from a peak value to zero each half cycle of the line frequency. As a result, undervoltage sensing techniques generally require more than one period of line frequency to annunciate a loss of source.

Several factors may be used to determine the storage potential value of the switched hold-up capacitance 156. For example, the overall power conversion efficiency, input to load, is one factor. As shown in the graph of FIG. 3, a lower isolating converter input voltage range, achieved by a higher capacitance in conventional designs, generally leads to a higher efficiency. Another factor used to determine the storage potential value of the switched hold-up capacitance 156 is the power required by the load during the loss of the input source $V_S$ wherein greater load power requirements generally lead to a higher capacitance. Additionally, losses incurred in the switched connection path along with minimum input voltage specifications or maximum duty cycle specifications of the power conversion stage also may be used to determine the storage potential value of the switched hold-up capacitance 156.

In some embodiments, the hold-up capacitance 156 is coupled to the power conversion stage 144 output by an electronic switch 152. Electronic switch 152 may be a low impedance device, a high impedance device, or even a device with controllable impedance. In some cases, a resistor may be employed in lieu of the electronic switch 152. In other cases, electronic switch 152 is a diode connected resistor.

Figure 4B:
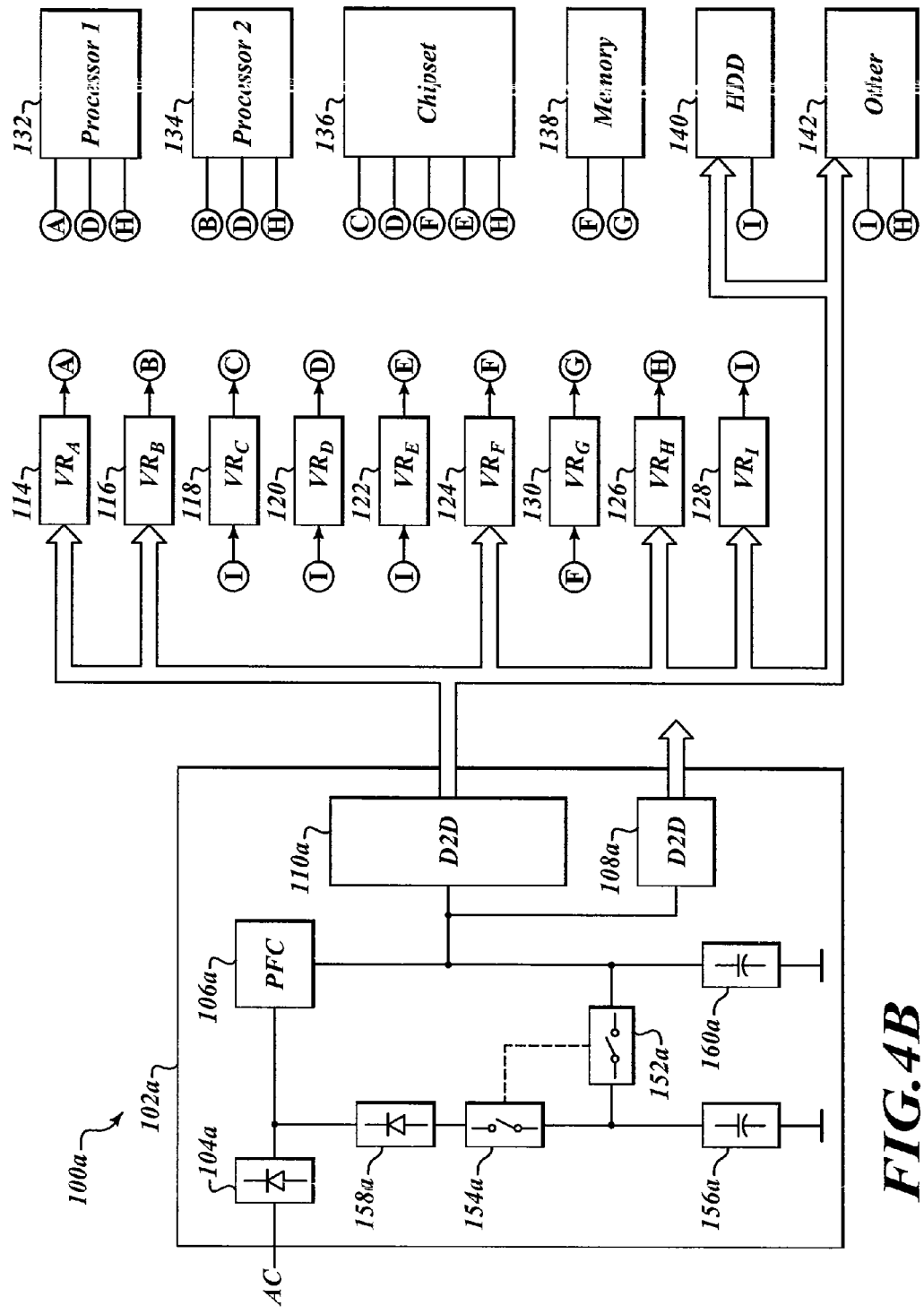
FIG. 4B is a schematic diagram of a power architecture having an energy storage circuit according to one illustrated embodiment of the present disclosure utilized in a computing server.

FIG. 4B is a schematic diagram of a power architecture 102a having an energy storage circuit utilized in a computing server 100a. An energy storage circuit in FIG. 4B includes electronic switches 152a, 154a, and 158a, a hold-up capacitance 156a, and an operating capacitance 160a. The energy storage circuit of FIG. 4B represents a similar architecture to the energy storage circuit 162 of FIG. 4A. Accordingly, the electronic switches 152a, 154a, and 158a, a hold-up capacitance 156a, and an operating capacitance 160a may correspond to the electronic switches 152, 154, and 158, the hold-up capacitance 156, and the operating capacitance 160 of FIG. 4A.

FIG. 4B further includes a power factor correction circuit 106a, a DC-to-DC converter 108a, and a DC-to-DC converter 110a as part of the power architecture 102a. An alternating current (AC) source is illustrated as being input to an initial rectifier circuit 104a of the power architecture 102a, however a rectified AC input or a DC input may also be used to source the power architecture 102a. The power architecture 102a is included in a computing server 100a that shares computing server elements 114-142 that are the same as those found in FIGS. 1A and 1B.

The operation of the power architecture 102a in FIG. 4B is similar to that of the power architecture 172 of FIG. 4A. Electronic switches 152a and 154a work cooperatively to charge the hold-up capacitance 156a from the output of power factor correction circuit (PFC) 106a during normal operation and discharge the hold-up capacitance 156a through the input of power factor correction circuit (PFC) 106a during hold-up operation.

The control of electronic switches 152a and 154a may be carried out with an analog control circuit, implemented a digital control circuit, a software control circuit, or any combination thereof. As described herein, the operating capacitance 160a may be substantially smaller than the hold-up capacitance 156a.

Figure 5B:
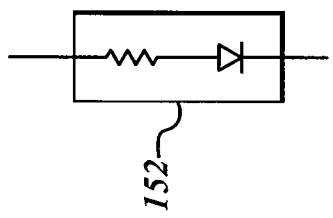
FIG. 5B is a schematic diagram of a passive electronic switch according to another embodiment, suitable for use in the power architecture of FIGS. 4A and 4B.
Figure 5A:
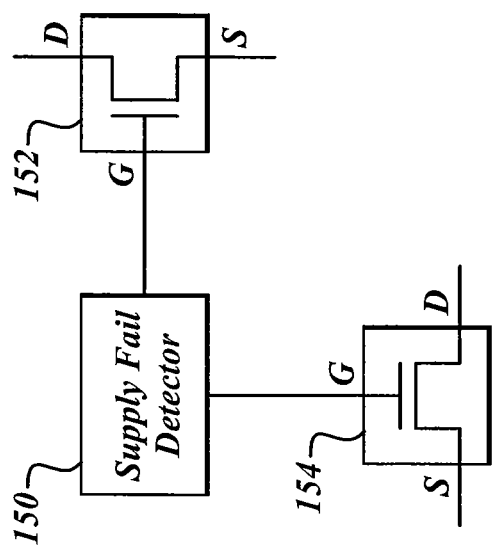
FIG. 5A is a schematic diagram of an actively controlled electronic switch according to another illustrated embodiment, suitable for use in the power architecture of FIGS. 4A and 4B.

FIG. 5A shows an electronic switch according to one illustrated embodiment, which may be used in the energy storage circuits of FIGS. 4A and 4B. The electronic switch 152 is shown as an N-channel metal oxide semiconductor field effect transistor (MOSFET). It is understood that a P-channel MOSFET or another type of semiconductor switch configuration may be used.

FIG. 5B shows an electronic switch 152 according to another illustrated embodiment, which may be used in the power architecture 172 of FIGS. 4A and 4B. The electronic switch 152 includes a resistor $R_1$ and a diode $D_1$ in series. In this configuration, during normal operation, the output $V_{INT}$ from the power conversion stage 144 will trickle charge the hold-up capacitance 156. Alternatively, during hold-up operation, the diode $D_1$ will prevent a direct current path from hold-up capacitance 156 to the output node of the power conversion stage 144.

Referring back to FIGS. 4A, 4B, and 5A, electronic switch 152 may be implemented as an enhancement mode N-channel MOSFET or the like. In such cases, the source node S of the electronic switch 152 is preferably connected to the hold-up capacitance 156, and drain node D of the electronic switch 152 is preferably connected to the power conversion stage 144 output. In this configuration, the cathode of the N-channel MOSFET's inherent body diode is connected so as to block the voltage at $V_{INT}$ when desired. That is, the voltage at $V_{INT}$ is blocked from the voltage of hold-up capacitance 156 when switch 152 is open and the hold-up capacitance 156 is discharged.

During normal operation, when the input source voltage $V_S$ to the power conversion stage 144 is present, the supply fail detector stage 150 asserts a voltage on a gate node G of the electronic switch 152. Since the voltage on the gate G is sufficient to turn ON the electronic switch 152, the electronic switch 152 is closed and the hold-up capacitance 156 is coupled to the output node of the power conversion stage 144. Conversely, during hold-up operation, the supply fail detector 150 removes the voltage from the gate node G of the electronic switch 152, which forces the electronic switch 152 into its default cutoff state. In the cutoff state, electronic switch 152 electrically isolates the hold-up capacitance 156 from the output node of the power conversion stage 144.

The use of electronic switches, and in particular N-channel MOSFETs, may be advantageous because the operating capacitance 160 utilized during normal operation is preferably larger than the operating capacitance utilized during hold-up operation. The operating capacitance utilized during hold-up can be smaller for many reasons. For example, the operating capacitance utilized during hold-up can be smaller due to the lack of AC ripple current, which is present when the source $V_S$ is AC, but the hold-up signal from hold-up capacitance 156 is DC. In particular, the need to filter potential input ripple is sometimes specified in audio susceptibility, conducted susceptibility, or similar electro-magnetic compliance requirements of load circuits. These load circuit requirements may apply to AC or DC sources, but during hold-up operation, the hold-up capacitance 156 provides a predictable DC input signal.

In the power architecture 172, the fast electronic switch 152 is capable of quickly removing the hold-up capacitance 156 from the output node of the power conversion stage 144 when the input $V_S$ reaches a particular threshold. As described below, the output node of hold-up capacitance 156 may then be coupled to the input node of the power conversion stage 144. During normal operation, when sufficient $V_S$ is present, the electronic switch 152 allows hold-up capacitance 152 to be coupled to the operating capacitance 160, thereby providing the higher effective operating capacitance often desired in this mode.

Referring to FIGS. 4A, 4B, and 5A, electronic switch 154 may be implemented as a depletion mode N-channel MOSFET or the like, which couples the hold-up capacitance 156 to an input node of the power conversion stage 144 during hold-up operation. In such configurations, the drain node D of the electronic switch 154 is preferably connected to the hold-up capacitance 156, and the source node S of the electronic switch 154 is preferably connected to the input node of the power conversion stage 144. Often, a floating gate drive transformer circuit or other isolating means, such as a high side driver IC, will be utilized. During normal operation, when sufficient input source voltage $V_S$ is applied to the power conversion stage 144, the electronic switch 154 is off. As described above, in normal operation, hold-up capacitance 156 is coupled with operating capacitance 160. Alternatively, when the input $V_S$ reaches a particular threshold, the electronic switch 154 is turned on. When electronic switch 154 is turned on, the output node of hold-up capacitance 156 is coupled via electronic switch 154 to the input node of the power conversion stage 144, and current flows from the hold-up capacitance 156 to the input node of the power conversion stage 144.

If the power architecture 172 of FIG. 4A is supplied with a DC input source at $V_S$, the energy storage circuit 162 can normally be designed with a lower amount of operating capacitance than if the power architecture 172 is supplied with a rectified AC input. One reason is that in DC applications, the limitations on control loop bandwidth of the power conversion stage 144 is substantially reduced or even eliminated. Additionally, a lower energy storage capability (reduced capacitance) is sufficient because the DC input source generally has little or no line frequency ripple, and what ripple exists can be effectively rejected by the wider bandwidth power conversion stage. As one more reason, the detection of a loss of the DC input source is simpler and faster than the detection of the loss of a rectified AC source.

When the DC input source $V_S$ to the power conversion stage 144 is outside of an acceptable range, the energy storage circuit 162 switches the hold-up capacitance 156 from the output node to the input node of the power conversion stage 144. During the hold-up mode, the hold-up capacitance 156 will act as the supply voltage to the power conversion stage 144. In some embodiments, the hold-up capacitance 156 releases its energy until its voltage approaches or even reaches zero.

AC input applications typically include a rectifier between the actual power signal source and the input $V_S$ to power conversion stage 144. See, for example rectifier 104 of FIG. 1B. For DC input applications, an optional rectifier or equivalent circuitry to block $V_S$ from a lower input source during loss of input can also be added. Such blocking circuitry may be used because the lost source signal input may provide a low impedance path and not simply an open circuit.

In some embodiments, the blocking circuitry can be achieved with minimal impact to efficiency with an N-channel MOSFET. In such an embodiment, the drain of the MOSFET typically connects to the input node of the power conversion stage, and the source of the MOSFET is oriented towards the input DC input source signal. In this configuration, the MOSFET can be turned on during normal operation, resulting in low voltage drop and minimal losses, and the MOSFET can be turned off when the input signal falls outside of a determined threshold range. The MOSFET can be driven by an appropriate interface to the Supply Fail Detector (150).

Other factors may be considered when the input source $V_S$ to power conversion stage 144 is a rectified AC signal. For example, some AC input applications are designed for a high power factor that tries to align the current waveform to its voltage counterpart and for limiting input current harmonics. In such applications, the control loop bandwidth is generally configured to be significantly lower than the AC input source frequency, which is a limitation not found with pure DC input sources. As a result, in AC input architectures, it is difficult for the power conversion stage 144 to quickly respond to fast transients on the AC input source.

The connection of the hold-up capacitance 156 to the input of the power conversion stage 144 following sudden loss of AC input source $V_S$ is one transient that may appear at the input of the power conversion stage 144. Upon detection of the loss of AC input source, the input to the power conversion stage 144 may go from as low as zero volts to the fully charged DC voltage of the hold-up capacitor 156 almost instantaneously due to the fast switching of electronic switches 152, 154. However, since this transition is expected, then such knowledge of an impending transition may be used advantageously.

In order to take advantage of the fast switching and hold-up capacitance 156 features of the circuit of FIG. 4A, an optional analog or digital feedback loop may accept a signal from the Supply Fail Detector 150 upon detection of loss of source. The signal from the Supply Fail Detector 150 can be used to alter the feedback or feedforward control of power conversion stage 144.

The low bandwidth loop generally utilized for normal operation from AC control loop bandwidth can be increased in different ways. For example, the low bandwidth loop can be increased by switching in different, optional output feedback or line feedforward components in analog control loops. As another example, the low bandwidth loop can be increased by selecting alternate control loop parameters in digital control loops. The wider bandwidth control loop can be switched in upon the detection of loss of source input to the power conversion stage 144.

For example, in a power architecture having an AC rectified input source $V_S$, the natural transition of the input signal leads to a design of a power conversion stage 144 having a response time that is slow to account for changes in the input signal. Such circuit response is generally implemented with a control loop bandwidth that is low relative to the AC source frequency. Typically, certain values and connections of compensation components in the optional feedback loop can be used to implement the particular control loop bandwidth. That is, resistive and capacitive components can be connected in series or series parallel combinations. The components can then be placed in series with the feedback connection to an error amplifier input and from the error amplifier input to the error amplifier output. When the input signal $V_S$ fails, however, a substantial DC voltage signal provided by the switched in hold-up capacitance 156 will then provide the input signal $V_S$.

If compensation connections and values that are utilized during normal operation are left in the circuit, then those compensation connections and values may tend to cause the output of the power conversion stage 144 to overshoot its targeted output voltage $V_{INT}$ during hold-up operation. To alleviate problems caused by overshoot, however, the output signal of the supply fail detector stage 150 can be used by the power conversion stage 144 to alter to values and or connections of compensation components. A fast response to the input voltage signal $V_S$ change may be achieved with analog control or digital control. By altering the compensation parameters in response to the known and expected change to the input signal, the circuit can substantially maintain the desired output signal $V_{INT}$ from the power conversion stage 144 with little or no observable transient due to switchover from the normal input source $V_S$ to the source provided by hold-up capacitance 156. Altering the compensation parameters in this manner can selectively achieve a wider control loop bandwidth.

In one embodiment of the power architecture 172 of FIG. 4A, a rectified single phase 115 VAC source provides input $V_S$ to a power conversion stage 144. The power conversion stage 144 converts the 115 VAC source to a regulated output at $V_{INT}$ of approximately 300 VDC. Electronic switch 152 provides a diode-backed, simple resistive connection between the output of the power conversion stage 144 and the hold-up capacitance 156. Under voltage lockout circuit 148 and supply fail detector 150 work cooperatively to quickly overcome transient response and detect a loss of AC input power. Detection of a transient/failure condition toggles electronic switch 154 so as to couple hold-up capacitance 156 to the input node of the power conversion stage 144. In one embodiment, no signal is used to alter the control loop of the power conversion stage 144. In another embodiment, a configuration is used that accepts input from the Supply Fail Detector to reduce the filtering of the line feedforward signal, which results in faster response to input transitions.

Figure 6A:
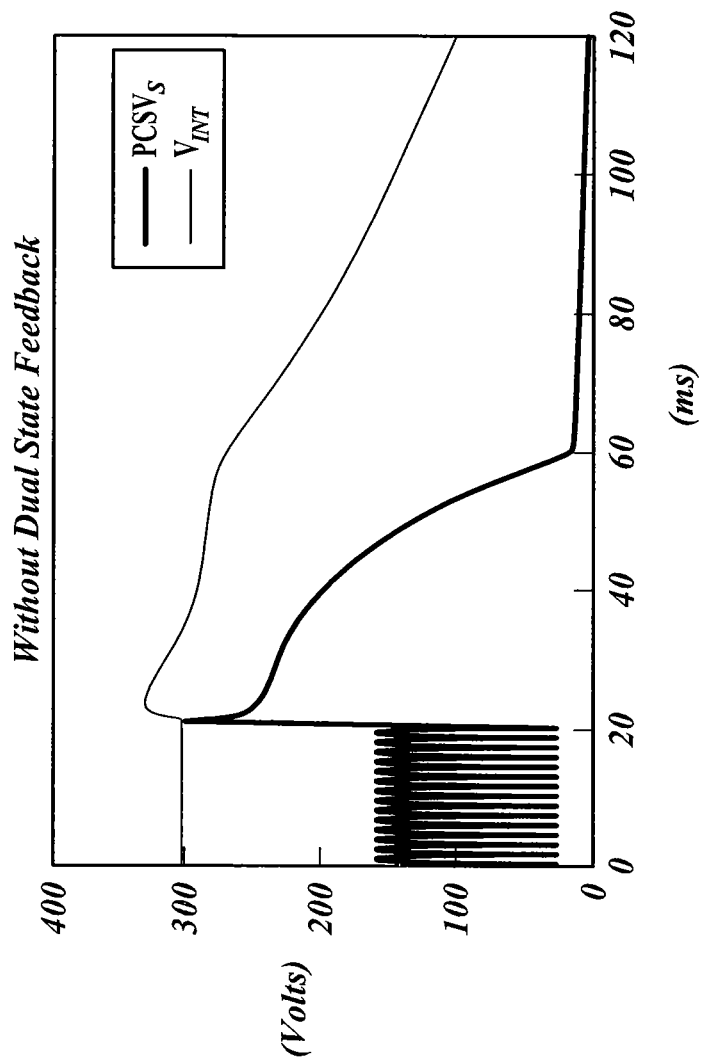
FIGS. 6A and 6B are graphs of simulated response plots of signals to and from a power conversion stage of a power architecture according to one illustrated embodiment.
Figure 6B:
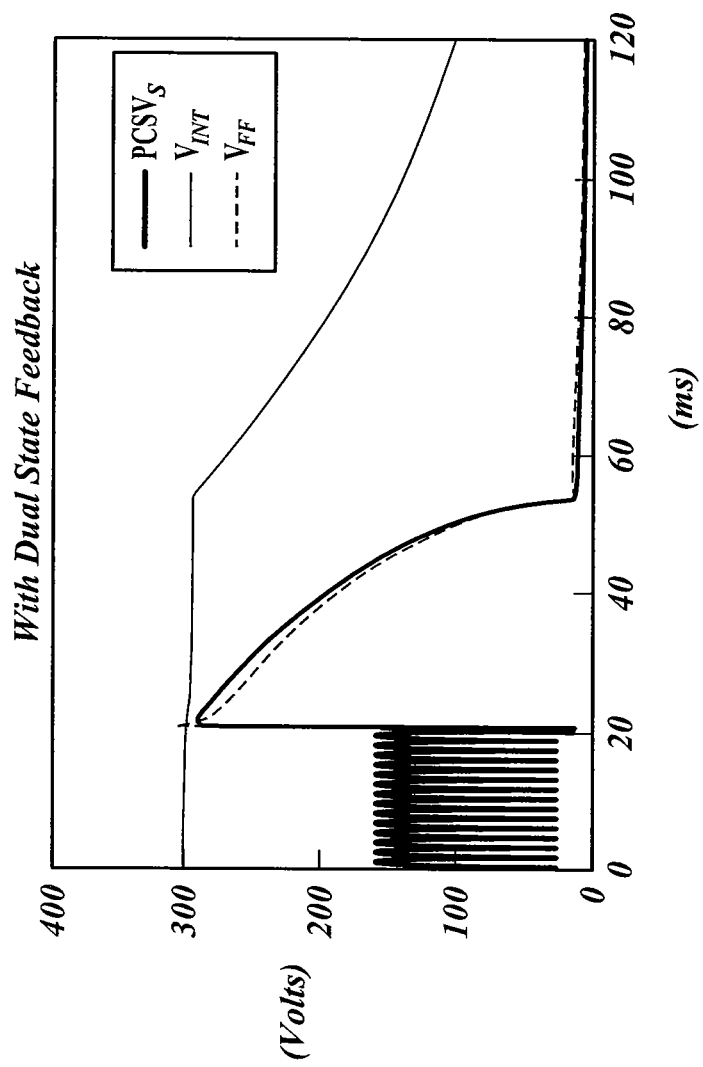

FIGS. 6A and 6B show simulated response plots of signals to and from a power conversion stage 144 during the hold-up operation of one embodiment of a preferred power architecture. In particular, FIG. 6A illustrates operation without alteration of the feed-forward signal and FIG. 6B illustrates operation with alteration of the feed-forward signal upon receipt of a signal from the Supply Fail Detector.

In FIG. 6A, a voltage scale from zero to 400 volts is illustrated on a vertical axis. An elapsed time scale is illustrated on a horizontal axis. Two signals are shown on the plot. A first signal is illustrated as a bold line, and the first signal is labeled in the plot's key as a PCS $V_S$ signal. PCS $V_S$ represents the input signal $V_S$ that is applied to a power conversion stage 144 input node. A second signal is illustrated as a regular weight (i.e., non-bold line), and the second signal is labeled in the plot's key as $V_{INT}$. The $V_{INT}$ signal represents the intermediate signal $V_{INT}$ at a power conversion stage 144 output node.

As shown in FIG. 6A, the input signal during the first 20 milliseconds of the recorded operation is a rectified AC signal cycling between about zero and 160 volts. The output signal $V_{INT}$ of the power conversion stage 144 is steady at about 300 VDC. At 20 milliseconds, the rectified AC input fails, the hold-up capacitance 156 is switched in as $V_S$, and the input to the power conversion stage 144 rises almost instantaneously to 300 VDC. The rise in the input signal $V_S$ causes the power conversion stage 144 output signal $V_{INT}$ to overshoot its desired output level of 300 VDC, at least for a short time, due to its low bandwidth control loop. Subsequently, as the hold-up capacitance 156 voltage approaches zero, the output signal $V_{INT}$ of the power conversion stage 144 also falls.

The circuit of the power conversion stage 144 used to generate the plot in FIG. 6A does not implement alteration of the feed-forward signal as described herein. Accordingly, FIG. 6A illustrates that the output of the power conversion stage 144 is held at or above its desired level for some time after the AC rectified input is lost.

FIG. 6B is contrasted with FIG. 6A. In FIG. 6B, the plot axes and the first 20 milliseconds of the simulation remain the same as in FIG. 6A. In FIG. 6B, however, the feed-forward signal $V_{FF}$ filtering is altered so as to result in a wider bandwidth control loop response to line transient. The feed-forward signal $V_{FF}$ is altered in response to a signal from the output of the power fail detection circuit 150 of FIG. 4A.

At 20 milliseconds in FIG. 6B, the input rectified AC signal is lost, which causes the switching in of hold-up capacitance 156 and the assertion of the feed-forward signal $V_{FF}$. The assertion of signal $V_{FF}$ causes the power conversion stage 144 to respond to line transients more quickly, and so the output signal $V_{INT}$ of the power conversion stage 144 remains at a desired level of 300 VDC for nearly 40 milliseconds.

Figure 7:
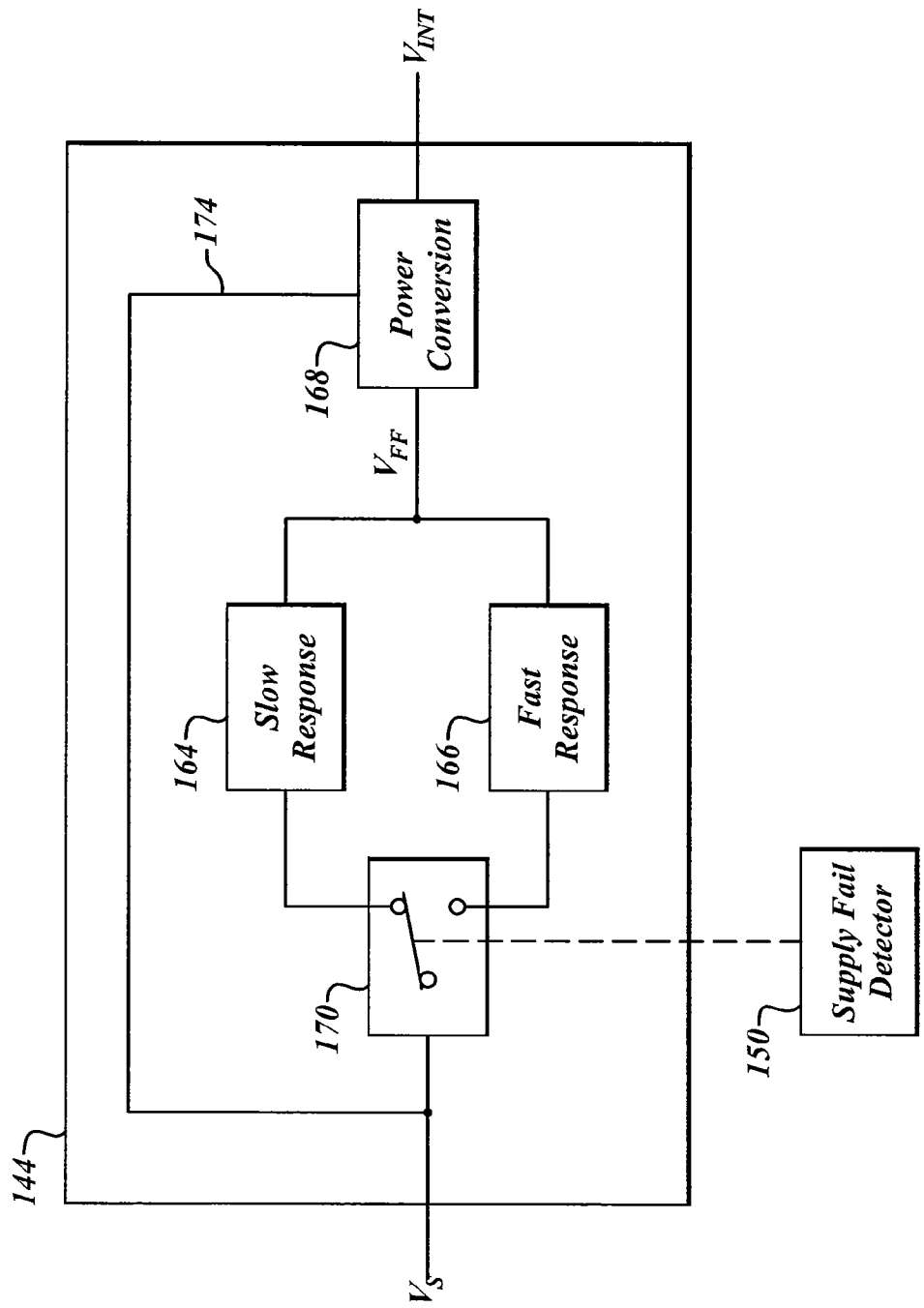
FIG. 7 is a schematic diagram illustrating a control element of a power conversion stage switching from a slow response feedforward control loop to a fast response feedforward control loop in response to a supply fail detection signal according to one embodiment.

FIG. 7 shows a power conversion stage 144 according to one illustrated embodiment, including separately selected slow response and fast response feedforward control loops. An input signal $V_S$ is presented to a switching circuit 170. Based on an output signal from the supply fail detector 150, the switching circuit 170 will pass the input signal to either a fast response circuit 164 or a slow response circuit 166. The output of the response circuit $V_{FF}$ is used in power conversion circuit 168 as part of the regulation control for the output signal $V_{INT}$. The power conversion circuit 168 cooperatively uses the input signal $V_S$, passed via line 174, and the output of the fast or slow response circuit $V_{FF}$ to control the input current waveshape for power factor correction. It is recognized that switching to the faster response feedforward control 166 improves transient control of $V_{INT}$, but the transient control improvement comes at the expense of input current waveshape control. The input current waveshape control is useful during normal operation for desirable power factor and low current harmonics; however such considerations are secondary or immaterial during hold-up operation after the loss of input source.

The individual circuits of the embodiment of FIG. 7 are generally well known but configured in what is believed to be a new way. For example, alteration of the feedforward filtering configuration was previously described; however, other methods may be used to implement the fast and slow response circuits 164, 166. For example, inductive circuits, digital circuits, or other types of response filtering circuits may be used. In some cases, only one response circuit is present and the switching circuit either couples the response circuit into the signal path or isolates the response circuit.

The conventional embodiment of the power architecture of FIG. 1A is now contrasted with an exemplary embodiment of the power architecture of FIG. 4A. In the conventional embodiment of FIG. 1A, where internal bus 109 is 12 VDC, the potential efficiency of the DC-DC converter is largely determined by the input voltage variation range. Conventional designs range from as high as about 95% efficiency when designed for little or no input variation to less than 90% efficiency when designed for wide input variation. Conventional commercially available products designed for a wide input range have an efficiency of about 85%.

In a tested conventional design, such as the design illustrated is FIG. 1A, an energy storage circuit 113 capacitance has a value of 150 µF. The input to the boost stage 107 is 115 VAC, and the regulated output from the boost stage is 300 VDC. In the embodiment, the energy storage circuit 113 stores 6.75 joules of energy. The following DC-to-DC converter 111 has an input range that operates at 300 VDC down to 200 VDC. When the AC input source is lost the power architecture enters a hold-up mode, and the energy storage circuit 113 continues to supply the DC-to-DC converter 111 until loss of regulation (i.e., down to 200 VDC). During the hold-up mode, 3.75 joules of energy are recovered from the energy storage circuit 113. The DC-DC converter 111 design for 200 VDC to 300 VDC input and 12VDC output operates at about 91% efficiency.

In one exemplary embodiment of FIG. 4A, the input $V_S$ to the power conversion stage 144 is a rectified 115 VAC signal. A hold-up capacitance 156 has a value of 150 µF and an operating capacitance 160 has a value of 15 µF. The regulated output $V_{INT}$ from the power conversion stage 144 is 300 VDC, and the hold-up capacitance 156 stores 6.75 joules of energy, which is the same amount of energy as stored in the conventional circuit. In the exemplary embodiment, the isolating conversion stage 146 following the power conversion stage 144 is implemented as a chopper stage, and electronic switches 152 and 154 are implemented with MOSFETs. During normal operation, electronic switch 152 is closed, and operating capacitance 156 is coupled in parallel with operating capacitance 160.

The exemplary embodiment of FIG. 4A was further studied and tested to show a limitation in maximum boost duty cycle of the power conversion stage 144 during hold-up. The limitation resulted in 0.22 joules of energy remaining in the hold-up capacitance 156 at the time that the output regulation of the power architecture 172 was lost.

Other alternative embodiments were also studied. For example, one resistive embodiment that was tested used simple resistors in place of electronic switches 152 and 154. In the resistive embodiment, in place of electronic switch 154, a low value (e.g., 4.7 ohm) resistor was substituted. Also in the resistive embodiment, in place of electronic switch 152, a high value (e.g., 10K) resistor was substituted. This resistive implementation was chosen for simplicity. The resistive embodiment has disadvantages but still demonstrates some benefits of the circuits described herein. For example, one undesirable effect of replacing electronic switch 152 with a 10K resistor is the slow charging of the hold-up capacitance 156. A slow-charging hold-up capacitance 156 leaves the power supply without hold-up protection until the hold-up capacitance 156 is charged either for the first time or after source input $V_S$ has been lost and resumed. Another undesirable effect of replacing electronic switch 152 with a 10K resistor is that the 10K resistor does not couple the hold-up capacitance 156 to the operational capacitance 160 during normal operation. Thus, operational capacitance 160 will be much larger than otherwise would be required. On the other hand, replacing electronic switch 152 with a 10K resistor is a very simple, low-cost design that permits easy implementation of a hold-up without more complicated switching circuitry.

The use of a 4.7 ohm resistor for 154 results in dissipation of a portion of the hold-up energy during use of that capacitor as the source for power conversion stage 144. During hold-up, the electronic switch 154 dissipated 0.39 joules of energy dissipation. Nevertheless, the recovered energy from hold-up capacitance 156 was 6.14 joules. Compared to the conventional embodiment of FIG. 1A, which recovered only 3.75 joules from energy storage device 113, the exemplary embodiment of FIG. 4A recovered 6.14 joules, which is an increase of 2.39 joules.

The exemplary embodiment of FIG. 4A has many advantages. First, in the exemplary embodiment, the isolating conversion stage 146 is implemented as a simple DC-to-DC chopper. The efficiency of the choppper can be as high as 96% or even higher. The high efficiency of the chopper is in contrast to the typical 92% or lower efficiency of a wide-input range DC-DC converter 111 implemented in a conventional system shown in FIG. 1A. In addition the exemplary embodiment permits a design utilizing a lower value of hold-up capacitance than even the conventional wide-input range DC-DC converter 111 due to the ability to discharge the hold-up capacitance to near zero. In addition, since the chopper has a fixed duty cycle and the DC-to-DC converter 111 stage of FIG. 1A has a wide input range, the exemplary embodiment of FIG. 4A tends to be a much simpler design. The simplicity of the chopper generally leads to a smaller, lower cost, and more reliable circuit.

In still another alternative embodiment, as shown in FIGS. 1B, 4A, and 4B for example, a DC-to-DC chopper is coupled to a power factor correction circuit 106 instead of a DC-to-DC converter 110. The chopper typically operates with a higher efficiency than the DC-to-DC converter 110 stage of FIG. 1B during normal operation. In addition, the efficiency of the DC-to-DC chopper typically does not change during hold-up loss of input operation because the input to the chopper remains constant. As a further possible advantage, however, the hold-up capacitance 156 energy is now processed as an input to the power conversion stage 144, and the power conversion stage 144 can operate at about 93%-95% efficiency. Thus, even though the overall power architecture efficiency may degrade during hold-up by 1%-3%, hold-up time for a given capacitance value can be increased by up to 50% or more.

In the exemplary embodiments described herein, the hold-up time for a given capacitance value can be increased by up to 50% or more over conventional power architecture. Alternatively, if the increase in hold-up time is not required by the power architecture design, then the value of the capacitance required for a different, smaller hold-up time can be reduced by one third or more.

Various embodiments using the exemplary power architectures described herein are possible. For example, in one embodiment, the output of the isolating conversion stage 146 may be directly regulated via the optional voltage loop setpoint signals shown in FIG. 4A between the isolating conversion stage 146 output $V_O$ and the power conversion stage 144 or the isolating conversion stage 146. In another embodiment, the output $V_O$ of the isolating conversion stage 146 can be used as a main supply voltage to a load. In still another embodiment, the output $V_O$ of the isolating conversion stage 146 can be used to supply additional load voltages by direct conversion of the main output, by using linear or switching regulators, or using some other means. In another embodiment, the output $V_O$ of the isolating conversion stage 146 may be used as an intermediate bus voltage to downstream regulators. In other embodiments, the output $V_{INT}$ of the power conversion stage 146 may be used to directly supply a load, where isolation from the input source is not used and the load is compatible with the voltage level of the power conversion stage 146. In still other embodiments, the isolating conversion stage 146 can also be implemented using a transformer with multiple secondary windings having good cross-regulation between windings. In such a transformer embodiment, the need for post-regulation of some or all load voltages may be eliminated.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A boost converter power supply, comprising:
   a boost stage configured to convert an input signal having a first voltage level into an intermediate signal having a second voltage level, the second voltage level higher than the first voltage level;
   an operating capacitor electrically coupled to an output of the boost stage;
   a hold-up capacitor electrically coupled to the output of the boost stage under a first condition and electrically coupled to an input of the boost stage under a second condition;
   a detection circuit configured to provide a failure signal upon loss of the input signal;
   a slow transient response circuit coupled to the input signal;
   a fast transient response circuit coupled to the input signal;
   a switching circuit that, responsive to receipt of the failure signal from the detection circuit, isolates the slow transient response circuit from the input signal and couples the fast transient response circuit to the input signal; and
   a controllable switching circuit having a first controllable switch element and a second controllable switch element, the first and second controllable switch elements each having a first node directly connected to the holdup capacitor, the first controllable switch element having a second node directly connected to the output of the boost stage, the second controllable switch element having a second node electrically coupled to the input of the boost stage, the controllable switching circuit responsive to the failure signal and operable to disconnect, via the second controllable switch element, the hold-up capacitor from the input of the boost stage and connect, via the first controllable switch element, the hold-up capacitor to the output of the boost stage in parallel with the operating capacitor in the first condition when the failure signal has a first state, the controllable switching circuit further operable to disconnect, via the first controllable switch element, the hold-up capacitor from the output of the boost stage and connect, via the second controllable switch element, the hold-up capacitor to the input of the boost stage in the second condition when the failure signal has a second state.

2. The boost converter power supply according to claim 1, further comprising:
   a load electrically coupled to the output of the boost stage to use energy supplied by the boost stage.

3. The boost converter power supply according to claim 1, further comprising:
   an isolating stage electrically coupled to the output of the boost stage to further convert the intermediate signal into an output signal level having a third voltage level.

4. The boost converter power supply according to claim 3 wherein the isolating stage is an unregulated DC-to-DC converter.

5. The boost converter power supply according to claim 3 wherein the isolating stage is a chopper circuit.

6. A power architecture, comprising:
   an electronic switch circuit having a first controllable switch and a second controllable switch;
   a power conversion circuit, the power conversion circuit including:
      an input node to receive an input power signal;
      an output node to supply an intermediate power signal;
      an operating capacitance node to electrically couple an operating capacitive device between the output node and a power rail;
      a slow transient response circuit coupled to the input node;
      a fast transient response circuit coupled to the input node;
      a switching circuit that responsive to a loss of the input power signal, isolates the slow transient response circuit from the input node and couples the fast transient response circuit to the input node; and
      a hold-up capacitance node directly connected to a first node of the first controllable switch and a first node of the second controllable switch, the hold-up capacitance node disconnected, via the second controllable switch, from the input node and connected, via the first controllable switch, to the output node when the electronic switch circuit is in a first state, the hold-up capacitance node disconnected, via the first controllable switch, from the output node and connected, via the second controllable switch, to the input node when the electronic switch circuit is in a second state; and
   a control circuit coupled to control the electronic switch circuit into the first state or the second state in response to the input power signal.

7. The power architecture according to claim 6, further comprising:
   the operating capacitive device; and
   a hold-up capacitive device electrically coupled between the hold-up capacitance node and the power rail.

8. The power architecture according to claim 6, further comprising:
   a power isolating circuit, the power isolating circuit having:
      an input node electrically coupled to the output node of the power conversion circuit; and
      an output node to supply an output power signal from the power architecture, wherein the power isolating circuit is a DC-to-DC power supply.

9. The power architecture according to claim 6 wherein the power conversion circuit is a boost converter.

10. The power architecture according to claim 9 wherein the boost converter is a power factor correction boost converter.

11. The power architecture according to claim 6 wherein the power conversion circuit is a SEPIC converter.

12. The power architecture according to claim 6 wherein the power conversion circuit is a buck-boost converter.

13. The power architecture according to claim 6 wherein the power isolating circuit is a chopper circuit.

14. The power architecture according to claim 6 wherein the control circuit includes an under voltage lockout circuit.

15. The power architecture according to claim 7 wherein the hold-up capacitive device is substantially larger than the operating capacitive device.

16. A method of maintaining an output voltage level of a power architecture, comprising:

receiving a first input signal at an input node of a power conversion stage;

converting the first input signal into a first intermediate signal by the power conversion stage;

controlling the power conversion stage using one of a slow transient response circuit or a fast transient response circuit coupled to the input node;

supplying the first intermediate signal to an output node of the power conversion stage, the first intermediate signal having a particular voltage level;

charging a hold-up capacitance;

connecting the hold-up capacitance to the output node of the power conversion stage through a closed first controllable switch, the first controllable switch having a first node directly connected to the hold-up capacitance and a second node directly connected to the output node;

detecting a loss of the first input signal;

responsive to a loss of the input power signal, isolating the slow transient response circuit from the input node and coupling the fast transient response circuit to the input node;

opening the closed first controllable switch in response to the detection of the loss of the first input signal;

disconnecting the hold-up capacitance from the output node of the power conversion stage as a result of opening the closed first controllable switch; and electrically coupling the hold-up capacitance to the input node through a second controllable switch in response to the detection of the loss of the first input signal, the second controllable switch having a first node directly connected to the hold-up capacitance, the hold-up capacitance providing a second input signal to the power conversion stage and the power conversion stage supplying a second intermediate signal to the output node of the power conversion stage, the second intermediate signal having a voltage level that is substantially the same as the particular voltage level.

17. The method of maintaining an output voltage level of a power architecture according to claim 16, further comprising:

electrically coupling the hold-up capacitance to the output node of the power conversion stage prior to the detecting of the loss of the first input signal;

filtering the first intermediate signal with the hold-up capacitance when the hold-up capacitance is coupled to the output node of the power conversion stage; and supplying the second input signal when the hold-up capacitance is electrically coupled to the input node until the energy in the hold-up capacitance is substantially depleted.

18. The method of maintaining an output voltage level of a power architecture according to claim 16, further comprising:

electrically coupling a power isolating circuit to the output node of the power conversion stage;

receiving the first intermediate signal or the second intermediate signal at an input node of the power isolating stage; and supplying an isolated power signal at an output node of the power isolating stage.

19. The method of maintaining an output voltage level of a power architecture according to claim 16 wherein the supplying the isolated power signal comprises chopping the first intermediate signal or the second intermediate signal received at the input node of the power isolating stage.

20. The method of maintaining an output voltage level of a power architecture according to claim 16 wherein the converting includes increasing the voltage level of the first input signal or the second input signal.

21. The method of maintaining an output voltage level of a power architecture according to claim 16 wherein the converting includes decreasing the voltage level of the first input signal or the second input signal.

22. The method of maintaining an output voltage level of a power architecture according to claim 16 wherein receiving a first input signal includes receiving a rectified AC signal and the hold-up capacitance providing a second input signal includes providing a DC signal.

23. The method of maintaining an output voltage level of a power architecture according to claim 16 wherein the converting includes providing a low bandwidth voltage control loop to maintain a predetermined power factor correction.

* * * * *